US008712168B2

(12) United States Patent
Yamaguchi

(10) Patent No.: US 8,712,168 B2
(45) Date of Patent: Apr. 29, 2014

(54) IMAGE SORTING DEVICE, METHOD, PROGRAM, AND INTEGRATED CIRCUIT AND STORAGE MEDIUM STORING SAID PROGRAM

(75) Inventor: Koichiro Yamaguchi, Osaka (JP)

(73) Assignee: Panasonic Corporation, Osaka (JP)

(*) Notice: Subject to any disclaimer, the term of this patent is extended or adjusted under 35 U.S.C. 154(b) by 30 days.

(21) Appl. No.: 13/520,398

(22) PCT Filed: Jan. 19, 2011

(86) PCT No.: PCT/JP2011/000235
§ 371 (c)(1),
(2), (4) Date: Jul. 3, 2012

(87) PCT Pub. No.: WO2011/089884
PCT Pub. Date: Jul. 28, 2011

(65) Prior Publication Data
US 2012/0281887 A1 Nov. 8, 2012

(30) Foreign Application Priority Data

Jan. 25, 2010 (JP) ................................. 2010-012794

(51) Int. Cl.
*G06K 9/68* (2006.01)
(52) U.S. Cl.
USPC ............ 382/218; 382/195; 382/224; 382/274
(58) Field of Classification Search
USPC .................... 382/118, 195, 224, 274
See application file for complete search history.

(56) References Cited

U.S. PATENT DOCUMENTS

| 5,842,194 | A | * | 11/1998 | Arbuckle | 706/52 |
| 7,894,687 | B2 | * | 2/2011 | Kubo et al. | 382/274 |
| 7,912,246 | B1 | * | 3/2011 | Moon et al. | 382/103 |
| 8,194,939 | B2 | * | 6/2012 | Perlmutter et al. | 382/118 |
| 2007/0103565 | A1 | | 5/2007 | Xu et al. | |
| 2010/0278396 | A1 | | 11/2010 | Mitsuhashi et al. | |
| 2011/0115937 | A1 | * | 5/2011 | Sassa | 348/222.1 |
| 2012/0170856 | A1 | * | 7/2012 | Yamaguchi | 382/224 |
| 2012/0281887 | A1 | * | 11/2012 | Yamaguchi | 382/118 |

FOREIGN PATENT DOCUMENTS

| JP | 2001-333352 | 11/2001 |
| JP | 2005-149323 | 6/2005 |
| JP | 2006-350546 | 12/2006 |
| JP | 2007-129434 | 5/2007 |
| JP | 2008-71112 | 3/2008 |
| JP | 4232774 | 3/2009 |
| JP | 2009-265873 | 11/2009 |
| JP | 2009-301119 | 12/2009 |

OTHER PUBLICATIONS

International Search Report issued Mar. 1, 2011 in International (PCT) Application No. PCT/JP2011/000235.

* cited by examiner

*Primary Examiner* — Gregory M Desire
(74) *Attorney, Agent, or Firm* — Wenderoth, Lind & Ponack, L.L.P.

(57) ABSTRACT

Image group feature information indicating features of an image group composed of a plurality of images is calculated for each image group and, based on the calculated image group feature information and information indicating features of events into which image groups are to be classified, images are classified by image group.

11 Claims, 27 Drawing Sheets

FIG. 4

| Image ID | Color feature values | | | | | Facial feature values | | | | | | Object feature values | |
| --- | --- | --- | --- | --- | --- | --- | --- | --- | --- | --- | --- | --- | --- |
| | Black | Blue | Green | White | ... | Face1_ID/Area /Coordinates | Face2_ID/Area /Coordinates | Face3_ID/Area /Coordinates | ... | Number of faces | Maximum facial area | Object name | |
| 01001 | 0.1 | 0.2 | 0.6 | 0.1 | ... | 0001/0.3/ x0, y0-x1, y1 | 0002/0.1/ x2, y2-x3, y3 | 0003/0.2/ x4, y4-x5, y5 | ... | 5 | 0.3 | Car | |
| 01002 | 0.1 | 0.3 | 0.1 | 0.5 | ... | 0006/0.1/ x6, y6-x7, y7 | 0007/0.1/ x8, y8-x9, y9 | — | ... | 2 | 0.1 | Flower | |
| ... | ... | ... | ... | ... | ... | ... | ... | ... | ... | ... | ... | ... | |

FIG. 5

| Image group ID | Color feature value averages | | | | ... | Facial feature values | | | | | Object feature values | Total number of images | Group name | Event name |
|---|---|---|---|---|---|---|---|---|---|---|---|---|---|---|
| | Black | Blue | Green | White | | Face IDs | Overall maximum facial area | Total number of faces | Number of images with faces | Maximum number of faces | Object name | | | |
| 0001 | 0.1 | 0.2 | 0.4 | 0.3 | ... | 0001,0002, 0003,... | 0.4 | 7 | 2 | 5 | Car, flower | 5 | Kamikochi 2007 summer | Picnic, large group |
| 0002 | 0.1 | 0.3 | 0.1 | 0.5 | ... | 0008, 0009 | 0.2 | 2 | 1 | 2 | Ski | 2 | Shiga Kogen 2008 winter | Skiing, small group |
| ... | | | | | | ... | ... | ... | ... | ... | ... | ... | ... | ... |

FIG. 6

| Standard | Black 0.4 or greater | Blue 0.4 or greater | Green 0.4 or greater | White 0.4 or greater | Five people or more | Four people or fewer | ... |
|---|---|---|---|---|---|---|---|
| Event name | Fireworks | Scuba diving | Picnic | Skiing | Large group | Small group | ... |

FIG. 9

| Image group ID | Color feature value averages | | | | Facial feature values | | | | | Object feature values | Total number of images | Group name | Event name |
|---|---|---|---|---|---|---|---|---|---|---|---|---|---|
| | Black | Blue | Green | White | Face IDs | Overall maximum facial area | Total number of faces | Number of images with faces | Maximum number of faces | Object name | | | |
| ... | ... | ... | ... | ... | ... | ... | ... | ... | ... | ... | ... | ... | ... |
| 0010 | 0.1 | 0.3 | 0.4 | 0.1 | 0101, 0102, 0103, ... | 0.1 | 7 | 4 | 3 | Flower | 4 | Hakone 2008 summer | — |
| 0011 | 0.1 | 0.2 | 0.1 | 0.5 | 0108, 0109, 0110 | 0.1 | 4 | 2 | 2 | — | 3 | Niseko 2009 winter | — |
| 0012 | 0.1 | 0.8 | 0.1 | 0.0 | 0111, 0112 | 0.1 | 2 | 2 | 2 | Fish | 2 | Miyakojima 2009 summer | — |
| ... | ... | ... | ... | ... | ... | ... | ... | ... | ... | ... | ... | ... | ... |

FIG. 11

| Image group ID (501) | Color feature value averages (502) | | | | ... (523) | Facial feature values (503) | | | | | | Object feature values (504) | Total number of images (505) | Group name (506) | Event name (507) |
|---|---|---|---|---|---|---|---|---|---|---|---|---|---|---|---|
| | Black (521) | Blue (522) | Green | White | | Face IDs (531) | Overall maximum facial area (532) | Total number of faces (503) | Number of images with faces (533) | Maximum number of faces (534) | (535) | Object name (536) | | | |
| 0001 | 0.1 | 0.2 | 0.4 | 0.3 | ... | 0001, 0002, 0003, ... | 0.4 | 7 | 2 | 5 | | Car, flower | 5 | Kamikochi 2007 summer | — |
| ... | ... | ... | ... | ... | ... | ... | ... | ... | ... | ... | | ... | ... | ... | ... |
| 0010 | 0.1 | 0.3 | 0.4 | 0.1 | ... | 0101, 0102, 0103, ... | 0.1 | 7 | 4 | 2 | | Flower | 4 | Hakone 2008 summer | — |
| ... | ... | ... | ... | ... | ... | ... | ... | ... | ... | ... | | ... | ... | ... | ... |

FIG. 13

| Label | Determination result | Face ID_1 | Face ID_2 | Face ID_3 | ... |
|---|---|---|---|---|---|
| A | Family member | 0001 | 0003 | 0101 | ... |
| B | Family member | 0002 | 0151 | 0153 | ... |
| ... | ... | ... | ... | ... | ... |
| K | Friend | 0031 | 0032 | — | ... |
| L | Friend | 0033 | 0039 | 0040 | ... |
| ... | ... | ... | ... | ... | ... |
| W | Stranger | 0004 | — | — | ... |
| X | Stranger | 0008 | — | — | ... |
| ... | ... | ... | ... | ... | ... |

FIG. 14

| | | Group name | Boy A's third birthday | Mt. Kabuto insect collecting | T River mini-sports day 2009 | ... |
|---|---|---|---|---|---|---|
| | | Event name | Birthday party | Insect collecting | Sports day | ... |
| | Total number of images | | 2 | 16 | 3 | ... |
| Facial feature values | Stranger facial area ratio | | 0 | 0 | 0.01 | ... |
| | Stranger's face number ratio | | 0 | 0 | 2.3 | ... |
| | Stranger's face image ratio | | 0 | 0 | 1 | ... |
| | Maximum number of strangers' faces | | 0 | 0 | 4 | ... |
| | Maximum stranger facial area | | 0 | 0 | 0.1 | ... |
| | Strangers' face IDs | | — | — | 0041, 0042, ... | ... |
| | Friend facial area ratio | | 0 | 0.01 | 0 | ... |
| | Friend's face number ratio | | 0 | 0.56 | 0 | ... |
| | Friend's face image ratio | | 0 | 0.44 | 0 | ... |
| | Maximum number of friends' faces | | 0 | 2 | 0 | ... |
| | Maximum friend facial area | | 0 | 0.1 | 0 | ... |
| | Friends' face IDs | | — | 0004, 0008 | — | ... |
| | Family member facial area ratio | | 0.3 | 0 | 0.01 | ... |
| | Family member's face number ratio | | 1.5 | 0 | 0.67 | ... |
| | Family member's face image ratio | | 1 | 0 | 0.67 | ... |
| | Maximum number of family members' faces | | 2 | 0 | 1 | ... |
| | Maximum family member facial area | | 0.4 | 0 | 0.1 | ... |
| | Family members' face IDs | | 0001, 0002 | — | 0006 | ... |
| Image group ID | | | 0020 | 0021 | 0022 | ... |

FIG. 15

| Standard 1501 | 1511 Family member facial area ratio of 0.1 or greater | Non-family member's face image ratio of less than 0.5, non-family member's face number ratio of less than 1, and maximum number of non-family members' faces of less than 3 | Non-family member's face image ratio of 0.8 or greater, non-family member's face number ratio of 1.5 or greater, and maximum number of non-family members' faces of 3 or greater | ... |
|---|---|---|---|---|
| Event name | Birthday party | Insect collecting | Sports day | ... |

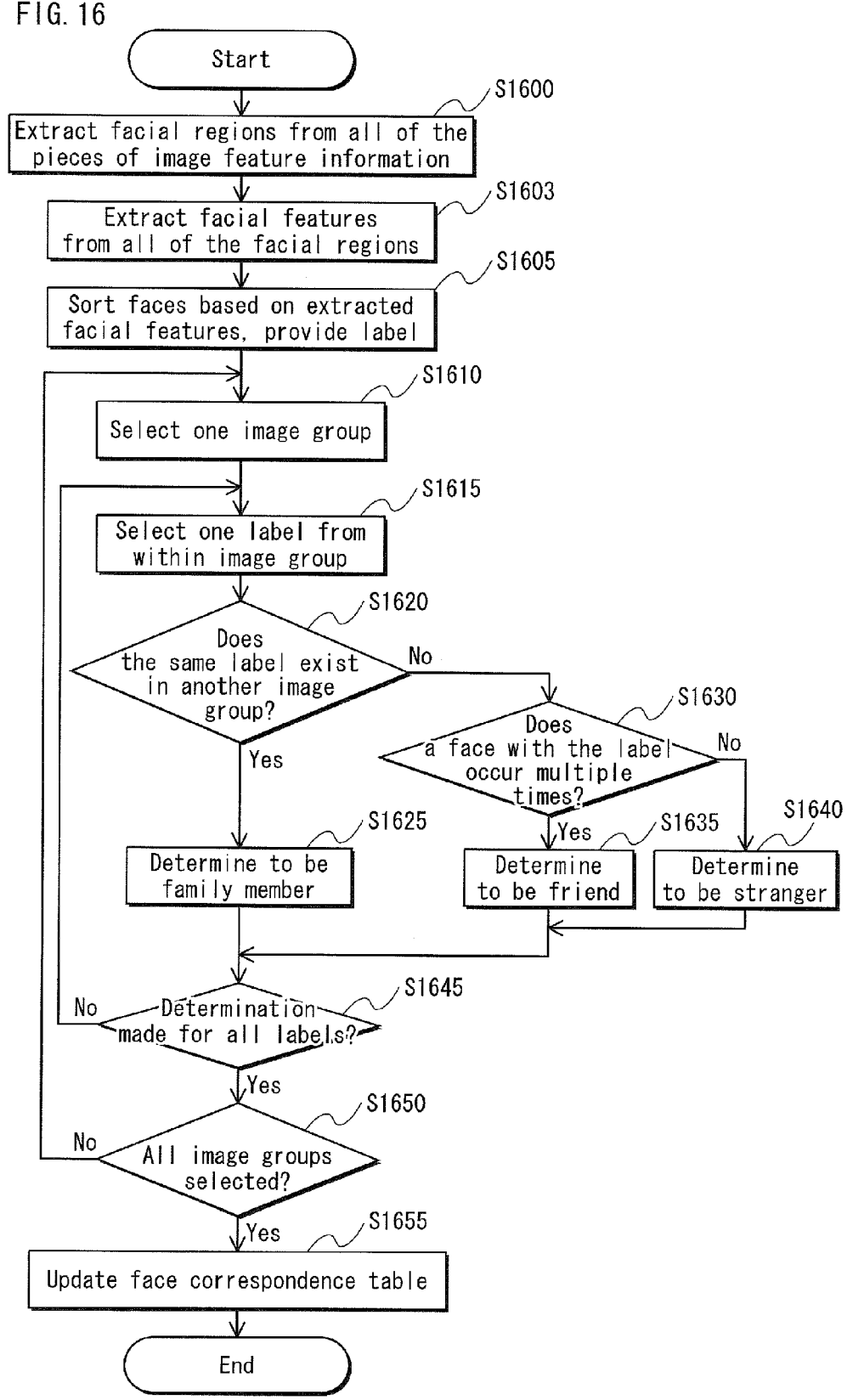

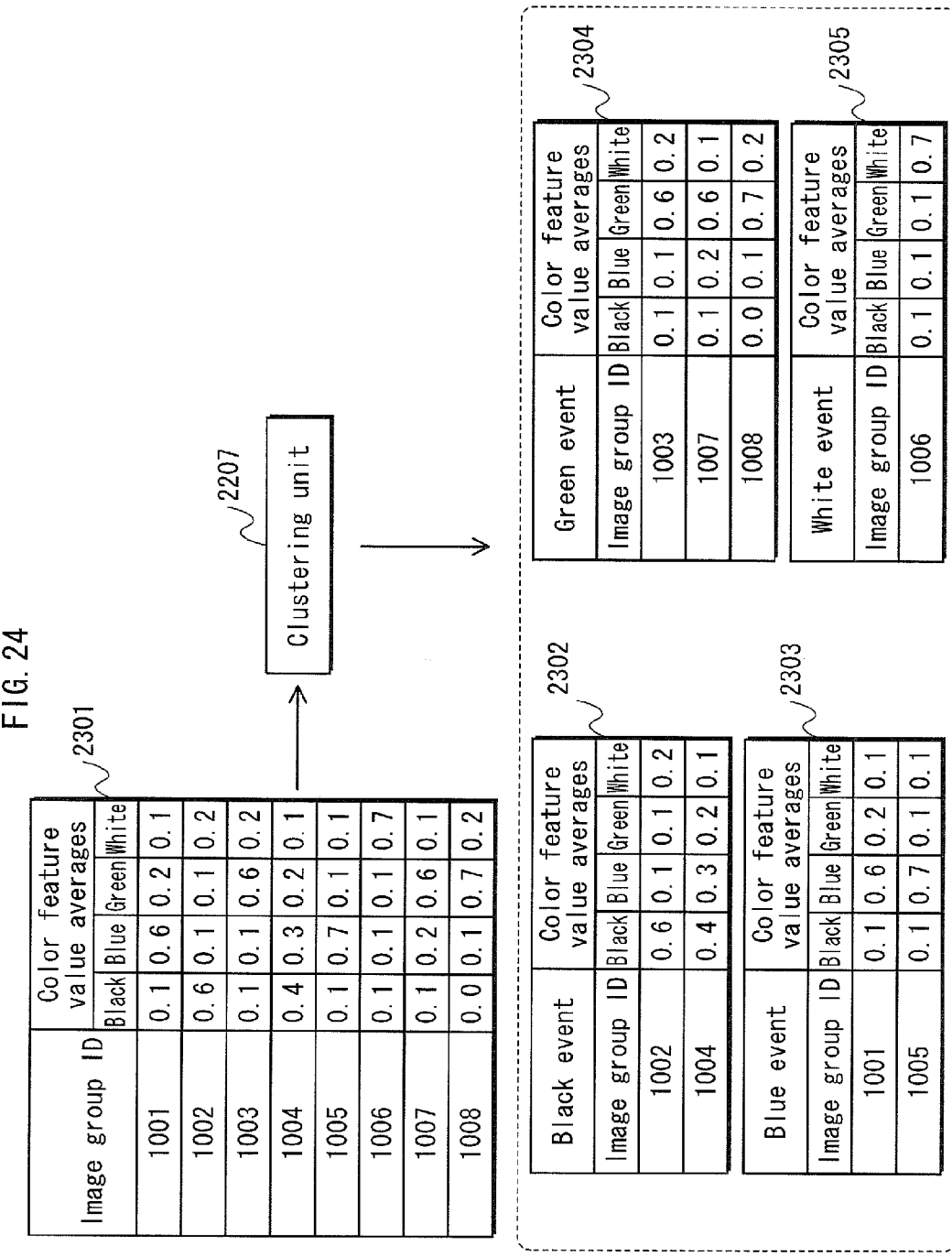

FIG. 25

| Color \ People | Black 0.4 or greater (2501) | Blue 0.4 or greater and less than 0.8 (2502) | Green 0.4 or greater (2503) | White 0.4 or greater (2504) | Blue 0.8 or greater (2505) | Blue 0.4 or greater in upper half (2506) | Blue less than 0.4 in upper half (2507) | ... |
|---|---|---|---|---|---|---|---|---|
| Five or more other people (large group) | Campfire | Pool | Picnic | Ice skating | Beach bathing | Sports day | Kendo | ... |
| Fewer than five other people (small group) | Fireworks | Fishing | Insect collecting | Skiing | Scuba diving | Roller skating | Everyday life at home | ... |

IMAGE SORTING DEVICE, METHOD, PROGRAM, AND INTEGRATED CIRCUIT AND STORAGE MEDIUM STORING SAID PROGRAM

TECHNICAL FIELD

The present invention relates to an image classification device that classifies images.

BACKGROUND ART

As digital image photographing apparatuses, such as digital still cameras and mobile phones having a camera function, gain popularity, hard discs and other recording media for recording photographed images have become available inexpensively.

Generally, users of digital image photographing apparatuses and the like (hereinafter simply referred to as users) store photographed images on a recording medium such as a hard disc with a large capacity.

If the number of stored images grows large, users have difficulty searching for a particular image. To facilitate searching, images may be classified into categories.

An example of technology for classifying images is to extract features of an image and use the extracted features to classify the image, as described in Patent Literature 1 and Patent Literature 2. Another known form of technology is to classify images based on the image capture time, as described in Patent Literature 3.

CITATION LIST

Patent Literature

Patent Literature 1: Japanese Patent No. 4232774
Patent Literature 2: Japanese Patent Application Publication No. 2006-350546
Patent Literature 3: Japanese Patent Application Publication No. 2001-333352

SUMMARY OF INVENTION

Technical Problem

Users typically capture images at events, such as a picnic or river fishing. Furthermore, the reason users view images is often to recall in detail the events where the images were captured.

Accordingly, there is a desire for images that belong to the same image group to be classified into the same category, where an image group is defined as a collection of related images, such as a collection of images captured at a particular event.

However, with the above technology for extracting features from each image and classifying the image with use of the extracted features, if a certain image has features differing from features of another image included in the same image group, the two images may be classified into different categories.

For example, suppose that categories for classification include a category "picnic" and a category "river fishing". If an image group composed of images photographed during a picnic includes an image representing a scene where people are playing by the riverside, the image of the scene where people are playing by the riverside may end up be classified into the category "river fishing", whereas the other images in the group would be classified into the category "picnic".

Furthermore, technology to classify images based on the image capture time does not allow for classification of images based on image features other than the image capture time.

The present invention has been conceived in light of the above problems, and it is an object thereof to provide an image classification device that, based on image features other than image capture time, classifies images without separating images belonging to the same image group into different categories.

Solution to Problem

In order to solve the above problems, an image classification device according to the present invention comprises: an image group feature calculation unit configured to calculate image group feature information, indicating features of an image group, based on image feature information, indicating features of an image, for all images in an image group or for a portion of the images in the image group, the portion including at least two of the images; and an image group classification unit configured to classify an image group into at least one of a plurality of different classifications based on the image group feature information for the image group and on a classification standard.

Advantageous Effects of Invention

With the above structure, the image classification device according to the present invention classifies images by image group based on image group feature information calculated based on image features not limited to image capture time. Accordingly, the image classification device achieves the advantageous effect of classifying, based on image features other than image capture time, images without separating images belonging to the same image group into different categories.

BRIEF DESCRIPTION OF DRAWINGS

FIG. 4 shows the data structure of image feature information stored in an image feature information storage unit 232.

FIG. 5 shows the data structure of image group feature information stored in an image group feature information storage unit 233.

FIG. 6 shows the data structure of event feature information stored in an event feature information storage unit 234.

FIG. 9 shows the data structure of image group feature information stored in the image group feature information storage unit 233.

FIG. 11 shows the data structure of image group feature information stored in the image group feature information storage unit 233.

FIG. 13 shows the data structure of a face correspondence table stored in a face correspondence table storage unit 1201.

FIG. 14 shows the data structure of image group feature information stored in an image group feature information storage unit 1233.

FIG. 15 shows the data structure of event feature information stored in an event feature information storage unit 1234.

FIG. 16 is a flowchart of face correspondence table generation operations performed by the image classification device 1200.

FIG. 24 is a schematic diagram of clustering operations performed by the image classification device 2200.

FIG. 25 shows the data structure of event feature information.

DESCRIPTION OF EMBODIMENTS

Embodiment 1

As an embodiment of an image classification device according to the present invention, the following describes an image classification device that calculates, for each image group composed of a plurality of images, image group feature information indicating features of the image group and, based on the calculated image group feature information and information indicating features of a plurality of different events into which image groups are to be classified, classifies images by image group into one of the events.

In this context, an image group is a collection a plurality of images designated by the user. Examples include a collection of images photographed at a picnic at Mt. Rokko in the early summer of 2009, or a collection of images photographed when going skiing at Shiga Kogen in the winter of 2008.

Furthermore, in this context, an event represents the content of an image group that has shared features. For example, an image group composed of images photographed during a picnic are classified into an event labeled "picnic", whereas an image group composed of images photographed when going skiing are classified into an event labeled "skiing".

Structure

Hardware Structure of Image Classification Device 100

Figure 1:
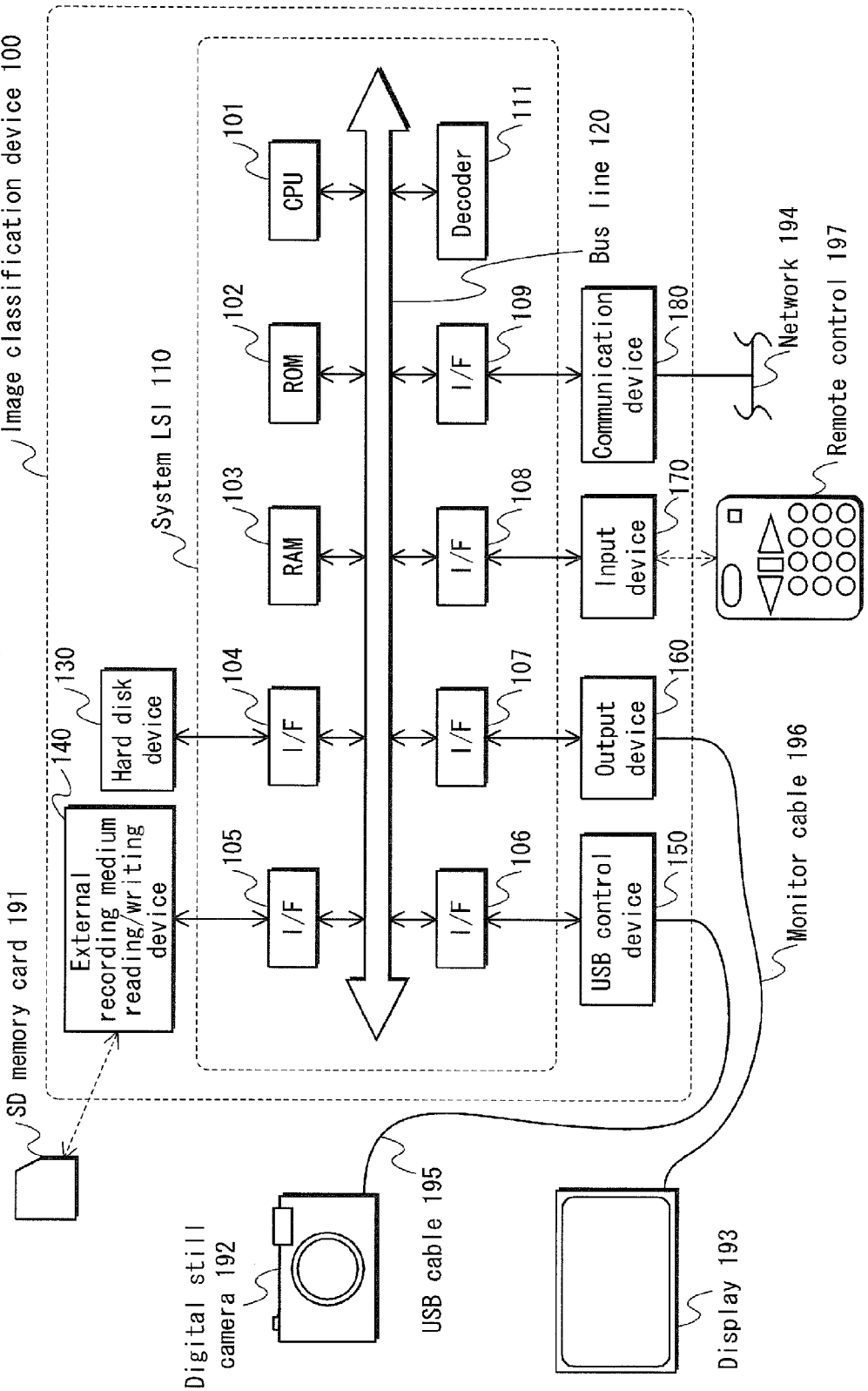
FIG. 1 is a block diagram showing the hardware structure of an image classification device 100.

FIG. 1 is a block diagram showing the main hardware structure of an image classification device 100.

The image classification device 100 stores images, which are digital photographs, as data encoded in the JPEG (Joint Photographic Experts Group) format and classifies the stored images.

Via a removable USB cable 195, the image classification device 100 connects with a device, typified by a digital still camera 192, that has images recorded thereon. Via a monitor cable 196, the image classification device 100 connects with a display 193 for displaying images. The image classification device 100 also connects with a network 194 and communicates wirelessly with a remote control 197 that accepts user operation commands. The image classification device 100 reads and writes data to and from an external recording medium typified by an SD memory card 191.

The image classification device 100 includes a system LSI (Large Scale Integrated circuit) 110, a hard disk device 130, an external recording medium reading/writing device 140, a USB control device 150, an output device 160, an input device 170, and a communication device 180.

The system LSI 110 is an LSI in which the following are combined onto a single integrated circuit: a CPU 101, a ROM 102, a RAM 103, a hard disk device interface 104, an external recording medium reading/writing device interface 105, a USB (Universal Serial Bus) control device interface 106, an output device interface 107, an input device interface 108, a communication device interface 109, a decoder 111, and a bus line 120. The system LSI 110 connects with the hard disk device 130, the external recording medium reading/writing device 140, the USB control device 150, the output device 160, the input device 170, and the communication device 180.

The CPU 101 connects with the bus line 120, and executes programs stored in the ROM 102 or the RAM 103 to control the ROM 102, the RAM 103, the hard disk device 130, the external recording medium reading/writing device 140, the USB control device 150, the output device 160, the input device 170, the communication device 180, and the decoder 111, thereby achieving a variety of functions. For example, the CPU 101 achieves a function to read encoded image data from the hard disk device 130, decode the read image data, and output the decoded image data to the display 193.

The ROM connects with the bus line 120 and stores therein data for use by the CPU 101 and a program that defines the operations of the CPU 101.

The RAM 103 connects with the bus line 120 and temporarily stores therein data resulting from execution of a program by the CPU 101. The RAM 103 also temporarily stores therein data such as data read from or data to be written to the hard disk device 130 and the external recording medium reading/writing device 140, as well as data received by or data to be transmitted by the communication device 180.

The decoder 111 is a DSP (Digital Signal Processor) having a function to decode encoded image data. The decoder 111 connects with the bus line 120, is controlled by the CPU 101, and has a JPEG decoding function.

The hard disk device interface 104 connects with the hard disk device 130 and the bus line 120 and intermediates in the exchange of signals between the hard disk device 130 and the bus line 120.

The external recording medium reading/writing device interface 105 connects with the external recording medium reading/writing device 140 and the bus line 120 and intermediates in the exchange of signals between the external recording medium reading/writing device 140 and the bus line 120.

The USB control device interface 106 connects with the USB control device 150 and the bus line 120 and intermediates in the exchange of signals between the USB control device 150 and the bus line 120.

The output device interface 107 connects with the output device 160 and the bus line 120 and intermediates in the exchange of signals between the output device 160 and the bus line 120.

The input device interface 108 connects with the input device 170 and the bus line 120 and intermediates in the exchange of signals between the input device 170 and the bus line 120.

The communication device interface 109 connects with the communication device 180 and the bus line 120 and intermediates in the exchange of signals between the communication device 180 and the bus line 120.

The hard disk device 130 connects with the hard disk device interface 104 and is controlled by the CPU 101. The hard disk device 130 has a function to read and write data to and from a built-in hard disk.

The external recording medium reading/writing device 140 connects with the external recording medium reading/writing device interface 105 and is controlled by the CPU 101. The external recording medium reading/writing device 140 has a function to read and write data to and from an external recording medium.

In this embodiment, the external recording medium is a DVD (Digital Versatile Disc), a DVD-R, a DVD-RAM, a BD (Blu-ray Disc), a BD-R, a BD-RE, the SD memory card 191, or the like. The external recording medium reading/writing device 140 has a function to read data from the DVD, the BD, or the like and a function to read and write data to and from the DVD-R, the BD-R, the BD-RE, the SD memory card 191, or the like.

The USB control device 150 connects with the USB control device interface 106 and is controlled by the CPU 101. The USB control device 150 has a function to read and write data to and from an external device via the removable USB cable 195.

In this embodiment, the external device is a device for storing images, such as the digital still camera 192, a personal computer, or a mobile phone having a camera function. The USB control device 150 reads and writes data to and from the external device via the USB cable 195.

The output device 160 connects with the output device interface 107 and the monitor cable 196 and is controlled by the CPU 101. The output device 160 outputs, via the monitor cable 196, data to be displayed on the display 193.

The input device 170 connects with the input device interface 108 and is controlled by the CPU 101. The input device 170 has a function to receive an operation command transmitted wirelessly from the user via the remote control 197 and to transmit the received operation command to the CPU 101.

The communication device 180 connects with the communication device interface 109 and the network 194 and is controlled by the CPU 101. The communication device 180 has a function to transmit and receive data to and from an external communication device via the network 194.

In this embodiment, the network 194 is achieved by optical communication lines, telephone lines, wireless lines, or the like, and connects with an external communication device, the Internet, etc.

The external communication device is a device, such as an external hard disk device, for storing therein images and the programs that define the operations of the CPU 101. The communication device 180 reads data from the external communication device via the network 194.

The image classification device 100, which is implemented by the hardware described above, achieves various functions by the CPU 101 executing the programs stored in the ROM 102 or the RAM 103 to control the ROM 102, the RAM 103, the hard disk device 130, the external recording medium reading/writing device 140, the USB control device 150, the output device 160, the input device 170, the communication device 180, and the decoder 111.

The following describes the functional structure of the image classification device 100 with reference to the figures.

Functional Structure of Image Classification Device 100

Figure 2:
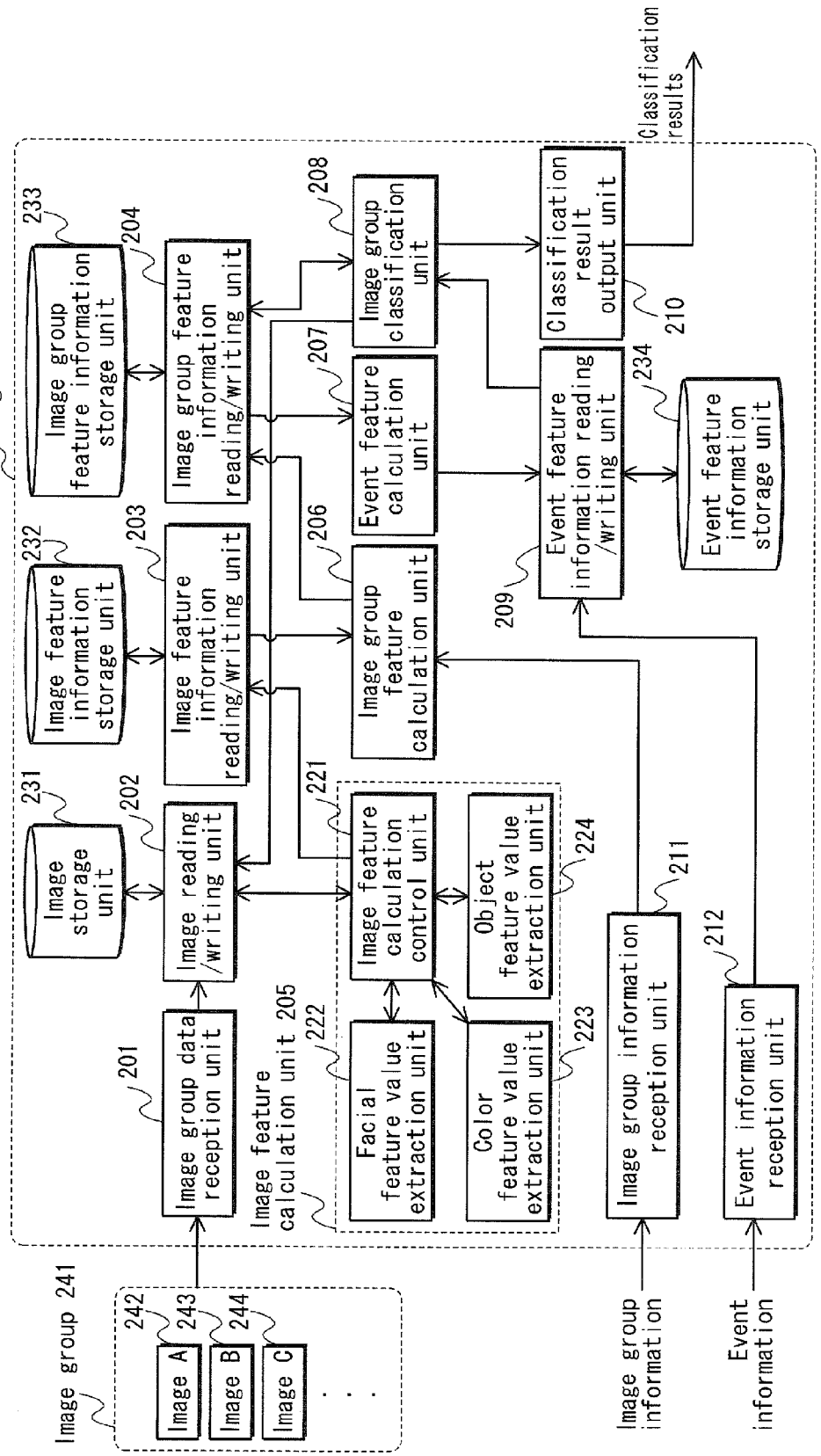
FIG. 2 is a functional block diagram showing the functional structure of the image classification device 100.

FIG. 2 is a functional block diagram showing the main functional blocks of the image classification device 100.

The image classification device 100 includes an image group data reception unit 201, an image reading/writing unit 202, an image feature information reading/writing unit 203, an image group feature information reading/writing unit 204, an image feature calculation unit 205, an image group feature calculation unit 206, an event feature calculation unit 207, an image group classification unit 208, an event feature information reading/writing unit 209, a classification result output unit 210, an image group information reception unit 211, an event information reception unit 212, an image storage unit 231, an image feature information storage unit 232, an image group feature information storage unit 233, and an event feature information storage unit 234.

The image feature calculation unit 205 further includes an image feature calculation control unit 221, a facial feature value extraction unit 222, a color feature value extraction unit 223, and an object feature value extraction unit 224.

The image group data reception unit 201 connects with the image reading/writing unit 202. The image group data reception unit 201 has a function to receive a designation of the images in an image group 241 composed of two or more images and a function to read the designated images as images included in the same image group.

The image group data reception unit 201 receives images from an external recording medium via the external recording medium reading/writing device 140, from an external device via the USB control device 150, or from an external communication device via the communication device 180.

The image group data reception unit 201 also has a function to assign an image ID to each of received images in order to identify the received image.

The image storage unit 231 is a storage region for storing digital photographs, which are each an image, as image data encoded in the JPEG format. The image storage unit 231 is implemented as a portion of the hard disk embedded within the hard disk device 130.

The pieces of data stored in the image storage unit 231 are logically managed by a directory structure within a file system.

Figure 3:
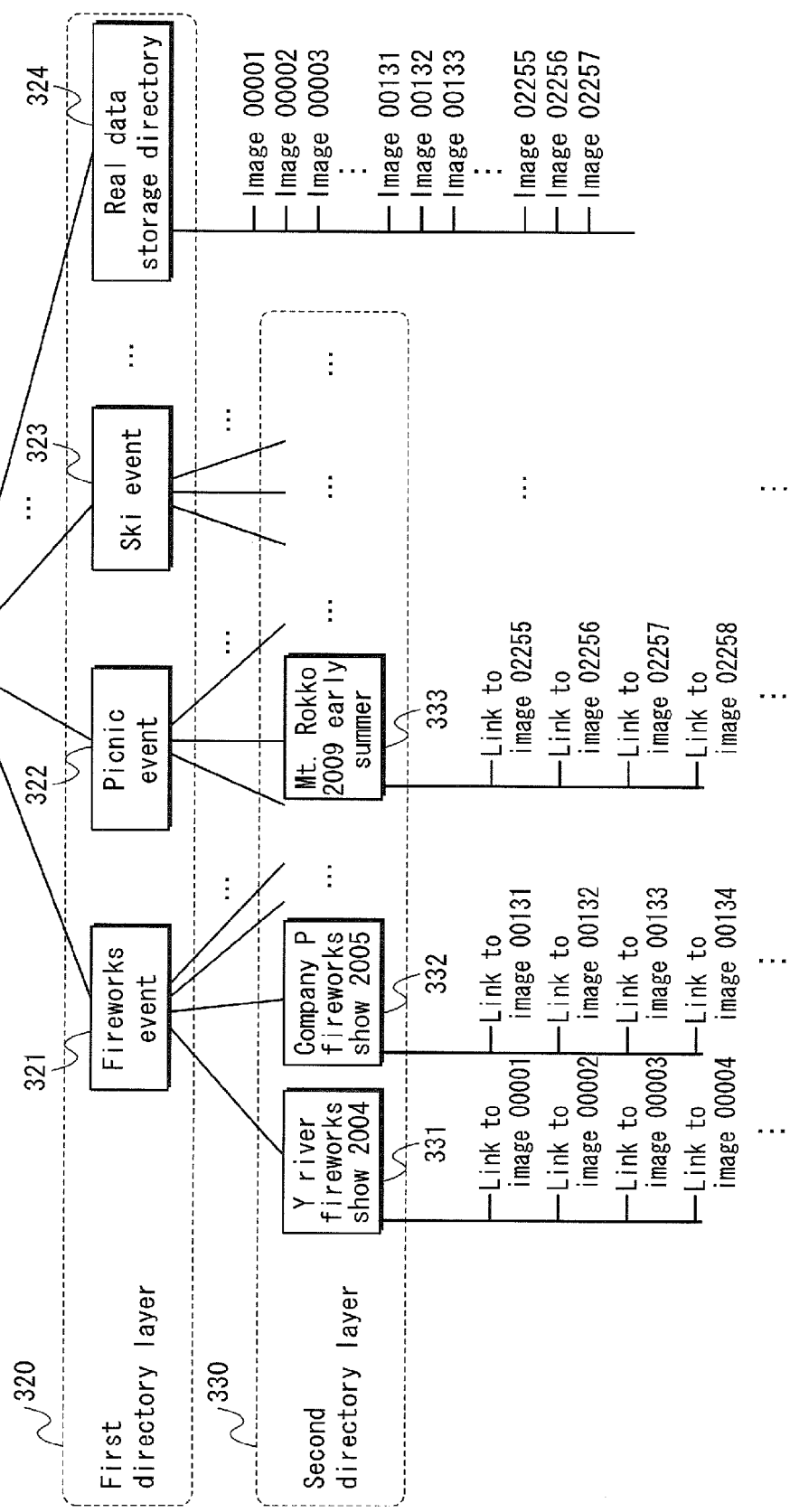
FIG. 3 shows the directory structure of an image storage unit 231.

FIG. 3 illustrates the directory structure of the image storage unit 231.

As shown in FIG. 3, the image storage unit 231 has a directory structure composed of three layers: a highest layer 310, a first directory layer 320, and a second directory layer 330.

The first directory layer 320 includes a plurality of event directories, such as a fireworks event directory 321, a picnic event directory 322, and a ski event directory 323, as well as a real data storage directory 324.

Here, the event directories are directories having the same name as the events into which image groups are classified. No two directories have the same name.

The real data storage directory 324 is a directory for storing images. Image data is stored only in the real data storage directory 324.

The second directory layer 330 includes a plurality of image group directories, such as a Y river fireworks show 2004 image group directory 331, a company P fireworks show 2005 image group directory 332, and a Mt. Rokko 2009 early summer image group directory.

The image group directories each correspond to an image group composed of images received by the image group data reception unit 201. Each image group directory stores information indicating, for all of the images included in the corresponding image group, the addresses of data among the data stored in the real data storage directory 324. The image group directory thus links to the image data.

The image group directories are each located in the event directory corresponding to the event into which the corresponding image group is classified.

If an image group is classified into a plurality of events, a directory with the same name and linking to the same images exists for each of the events.

Returning to FIG. 2 again, the functional structure of the image classification device 100 is now further described.

The image reading/writing unit 202 connects with the image feature calculation unit 205, the image feature calculation control unit 221, and the image group classification unit 208. The image reading/writing unit 202 has a function to read images stored in the image storage unit 231, a function to write images to the image storage unit 231, a function to change the directory structure of the image storage unit 231, and a function to change links to image data.

The facial feature value extraction unit 222 connects with the image feature calculation control unit 221 and has a function to store predetermined face models indicating facial features of a person and to refer to the stored face models in order to attempt to recognize any faces included in an image, calculating the number of recognized faces and the ratio of the area of the recognized faces to the total image area as facial feature values. The facial feature value extraction unit 222 also has a function to sequentially assign, to each recognized face, a face ID designating the recognized face.

In this embodiment, the face models are, for example, information on the brightness of a part of a human face such as eyes, nose, or mouth, and relative positional relations between these parts.

The color feature value extraction unit 223 connects with the image feature calculation control unit 221 and has a function to determine, for each pixel in an image, whether the color of the pixel is, for example, black, blue, green, white, etc. based on the color component of the pixel, such as the brightness of each of the colors red, green, and blue. The color feature value extraction unit 223 also has a function to calculate, for each of the determined colors, the ratio of the number of pixels of the determined color to the total number of pixels in the image.

In this embodiment, the color of a certain pixel is determined to be black, for example, if the brightness of each of the colors red, green, and blue in the pixel is, for example, less than 10%.

The object feature value extraction unit 224 connects with the image feature calculation control unit 221 and has a function to store predetermined object models indicating object features, to store the name of the object corresponding to the models, and to refer to the stored object models in order to attempt to recognize any objects included in an image. Furthermore, when successfully recognizing an object, the object feature value extraction unit 224 calculates the name of the object corresponding to the recognized object model as the object feature value.

In this embodiment, if the object models are, for example, models of a car, the object models are information on the brightness of car parts such as the windshield, tires, headlights, and the like, and relative positional relations between these parts.

The image feature calculation control unit 221 connects with the image reading/writing unit 202, the image feature information reading/writing unit 203, the facial feature value extraction unit 222, the color feature value extraction unit 223, and the object feature value extraction unit 224.

The image feature calculation control unit 221 has a function to read an image from the image storage unit 231 via the image reading/writing unit 202 and to calculate the image feature information for the read image using the facial feature value extraction unit 222, the color feature value extraction unit 223, and the object feature value extraction unit 224.

Details on the image feature information are provided below.

The image feature information storage unit 232 is a storage region for storing image feature information and is implemented as a portion of the hard disk embedded within the hard disk device 130.

FIG. 4 illustrates the data structure of image feature information stored in the image feature information storage unit 232.

As shown in FIG. 4, each piece of image feature information stored in the image feature information storage unit 232 includes an image ID 401 indicating the corresponding image, color feature values 403 indicating the color features of the corresponding image, facial feature values 404 indicating features of any faces recognized by the facial feature value extraction unit 222 in the corresponding image (hereinafter referred to as a "recognized face"), and object feature values 405 indicating any objects recognized in the corresponding image.

The color feature values 403 are composed of a ratio of the number of pixels of each color as calculated by the color feature value extraction unit 223, thus indicating the features of the colors of the image.

For example, the image feature information for an image with an image ID 401 of 01001 includes color feature values 403 indicating that the image has the following values: 10% for black 431, 20% for blue 432, 60% for green 433, and 10% for white 435.

The facial feature values 404 are calculated by the facial feature value extraction unit 222 and indicate features of any recognized faces included in the image. The facial feature values 404 include a combination, for each recognized face included in each image, of a recognized face ID, the ratio of the area occupied by the recognized face, and the coordinates of the recognized face. The facial feature values 404 further include a number of faces 444 indicating the number of recognized faces included in the image and a maximum facial area 445 indicating the ratio of the area occupied by the recognized face for the recognized face with the highest ratio among the recognized faces in the image.

The coordinates of the recognized face are composed of a pair of the coordinates of the upper left corner and the coordinates of the lower right corner of the rectangle having the smallest area among rectangles that surrounding a region occupied by face recognized by the facial feature value extraction unit 222.

For example, the facial feature values 404 in the image feature information corresponding to the image whose image ID 401 is 01001 indicate the following: recognition of face 0001 with an area ratio of 30%, face 0002 with an area ratio of 10%, and face 0003 with an area ratio of 20%; a total number of five faces; and an area ratio of 0.3 for the face with the highest area ratio among the recognized faces.

The object feature values 405 indicate the name of any objects recognized in each object as calculated by the object feature value extraction unit 224.

For example, in the image feature information corresponding to the image whose image ID 401 is 01001, the object feature values 405 indicate that the image of a car has been recognized as included in the image.

Returning to FIG. 2 again, the functional structure of the image classification device 100 is now further described.

The image feature information reading/writing unit 203 connects with the image feature calculation control unit 221 and the image group feature calculation unit 206. The image feature information reading/writing unit 203 has a function to read and write image feature information to and from the image feature information storage unit 232.

The image group information reception unit 211 connects with the image group feature calculation unit 206 and has a function to receive the name of each image group.

The image group feature calculation unit 206 connects with the image group information reception unit 211, the image feature information reading/writing unit 203, and the image group feature information reading/writing unit 204.

The image group feature calculation unit 206 has a function to read image feature information corresponding to every image in an image group from the image feature information storage unit 232 via the image feature information reading/writing unit 203 and to calculate image group feature information using the read image feature information and the name of each image group input from the image group information reception unit 211.

Details on the image group feature information are provided below.

The image group feature calculation unit 206 also has a function to assign an image group ID to the calculated image group feature information in order to designate the image group feature information.

The image group feature information storage unit 233 is a storage region for storing image group feature information and is implemented as a portion of the hard disk embedded within the hard disk device 130.

FIG. 5 illustrates the data structure of the pieces of image group feature information stored in the image group feature information storage unit 233.

As shown in FIG. 5, the pieces of image group feature information stored in the image group feature information storage unit 233 include an image group ID 501 indicating the corresponding image group, color feature value averages 502 indicating the color features of images belonging to the corresponding image group, facial feature values 503 indicating the features of any recognized faces in the images belonging to the corresponding image group, object feature values 504 indicating the name of any objects in the images belonging to the corresponding image group, a total number of images 505 indicating the number of images belonging to the corresponding image group, a group name 506 indicating the name of the corresponding image group, and an event name 507 indicating the name of the event into which the corresponding image group is classified.

The color feature value averages 502 are average values of the color features of images belonging to the corresponding image group. The color feature value averages 502 indicate the color features of the image group.

For example, the color feature value averages 502 corresponding to the image group whose image group ID is 0001 indicate that averages for the image group are 10% for black 421, 20% for blue 522, 40% for green 523, and 30% for white 524.

The facial feature values 503 indicate the features of any recognized faces included in the image group and are composed of the following: face IDs 531 of the recognized faces included in the images belonging to the corresponding image group; the overall maximum facial area 532, which is the largest among the maximum facial areas 445 of the images belonging to the corresponding image group; a total number of faces 533, which is the sum of each number of faces 444 in the images belonging to the corresponding image group; a number of images with faces 534, which is the number of images that include a recognized face; and a maximum number of faces 535, which is the largest of the numbers of faces 444 in the images belonging to the corresponding image group.

For example, the facial feature values 503 corresponding to the image group whose image group ID is 0001 indicate the following: faces 0001, 0002, and 0003 have been recognized, the overall maximum facial area is 40%, the total number of faces 533 is seven, the number of images with faces 534 is two, and the maximum number of faces 535 is five.

The object feature values 504 indicate the features of recognized objects included in the images belonging to the corresponding image group.

For example, the object feature values 504 corresponding to the image group whose image group ID is 0001 indicate that a car and a flower have been recognized in the images belonging to the corresponding image group.

The group name 506 indicates the name of the corresponding image group and is designated by the user. The directory names of the image group directories described above are determined by this group name 506.

The event name 507 indicates the name of each event into which the corresponding image group has been classified. This event name 507 determines the event directory or directories to which belongs the directory with the image group directory name determined by the group name 506.

Returning to FIG. 2 again, the functional structure of the image classification device 100 is now further described.

The image group feature information reading/writing unit 204 connects with the image group feature calculation unit 206, the event feature calculation unit 207, and the image group classification unit 208. The image group feature information reading/writing unit 204 has a function to read and write the image group feature information to and from the image group feature information storage unit 233.

The event information reception unit 212 connects with the event feature information reading/writing unit 209 and has a function to receive the event feature information.

In this embodiment, event feature information is information that acts as a standard for classifying image groups into events. Details are provided below.

The event feature information storage unit 234 is a storage region for storing event feature information and is implemented as a portion of the hard disk embedded within the hard disk device 130.

FIG. 6 shows the data structure of event feature information stored in the event feature information storage unit 234.

As shown in FIG. 6, the event feature information is composed of a pair of a standard 601 indicating the standard for classifying image groups and an event name 611 indicating the event into which image groups are classified by the standard 601.

The following describes pairs of a standard 601 and an event name 611.

The pair of the standard "black 0.4 or greater 602" and the event name "fireworks" indicates that the standard for classification as a fireworks event is that the value of black in the color feature value averages 502 be 40% or greater.

The pair of the standard "blue 0.4 or greater 603" and the event name "scuba diving" indicates that the standard for classification as a scuba diving event is that the value of blue in the color feature value averages 502 be 40% or greater.

The pair of the standard "green 0.4 or greater 604" and the event name "picnic" indicates that the standard for classification as a picnic event is that the value of green in the color feature value averages 502 be 40% or greater.

The pair of the standard "white 0.4 or greater 605" and the event name "skiing" indicates that the standard for classification as a skiing event is that the value of white in the color feature value averages 502 be 40% or greater.

The pair of the standard "five people or more 606" and the event name "large group" indicates that the standard for classification as a large group event is that the total number of faces 533 be five or greater.

The pair of the standard "four people or fewer 607" and the event name "small group" indicates that the standard for classification as a small group event is that the total number of faces 533 be four or fewer.

The event feature information reading/writing unit 209 connects with the event information reception unit 212, the event feature calculation unit 207, and the image group classification unit 208. The event feature information reading/writing unit 209 has a function to read and write event feature information to and from the event feature information storage unit 234.

The image group classification unit 208 connects with the image reading/writing unit 202, the image group feature information reading/writing unit 204, the event feature information reading/writing unit 209, and the classification result output unit 210.

The image group classification unit 208 has a function to read image group feature information from the image group feature information storage unit 233 via the image group feature information reading/writing unit 204 and to classify an image group corresponding to the read image group feature information into an event based on the read image group feature information and the event feature information stored in the event feature information storage unit 234.

The event feature calculation unit 207 connects with the image group feature information reading/writing unit 204 and the event feature information reading/writing unit 209.

The event feature calculation unit 207 has a function to read one or more pieces of image group feature information from the image group feature information storage unit 233 via the image group feature information reading/writing unit 204 and to create event feature information using the read image group feature information.

The classification result output unit 210 connects with the image group classification unit 208 and has a function to display, on the display 193, the result of classification of an image group performed by the image group classification unit 208.

With reference to the figures, the following describes the operations of the image classification device 100 having the above structure.

Operations

The main operations of the image classification device 100 are image group classification operations and event feature information generation operations. Image group classification operations are for input of images belonging to an image group and classification of the input image group into an event. Event feature information generation operations are for generation of new event feature information through designation of two or more image groups and extraction of features common to the designated image groups.

The following describes these operations with reference to the figures.

Image Group Classification Operations

Figure 7:
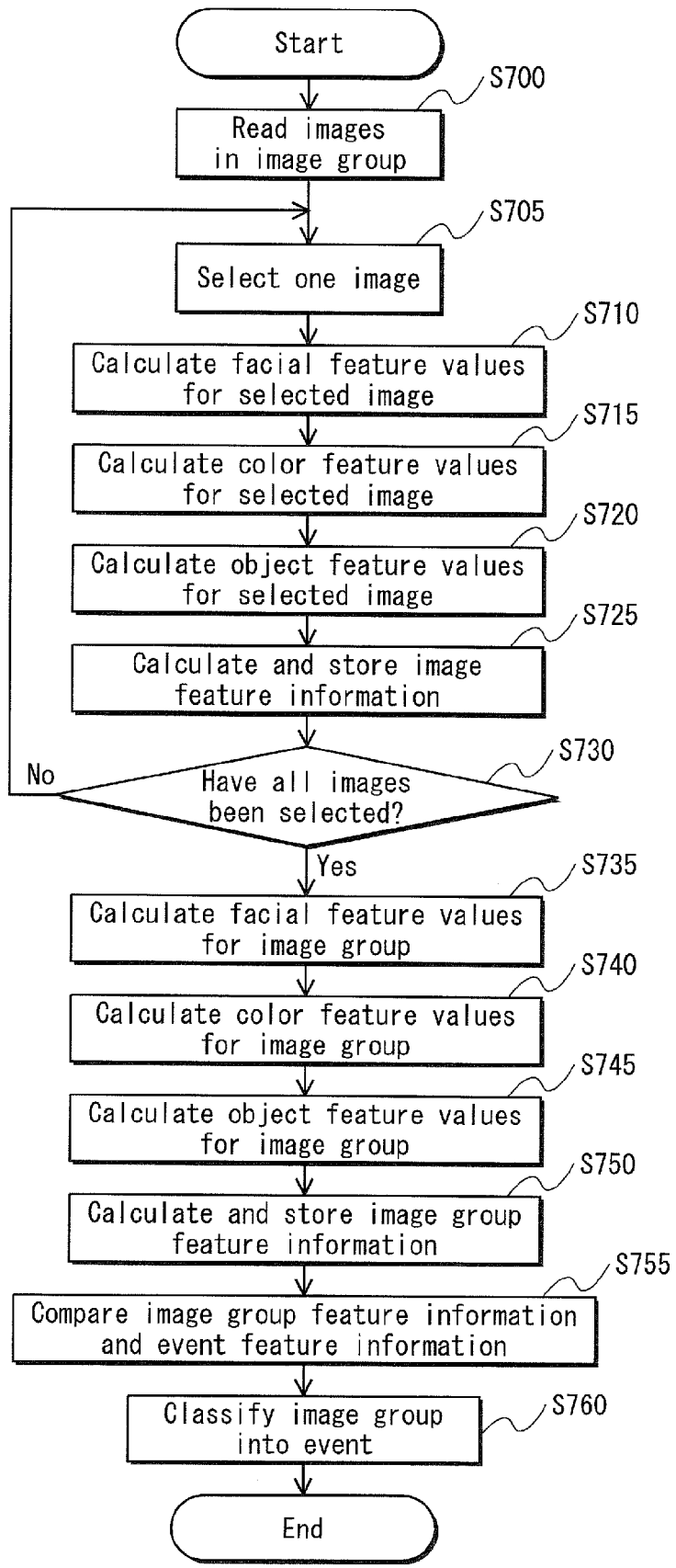
FIG. 7 is a flowchart of image group classification operations performed by the image classification device 100.

FIG. 7 is a flowchart of image group classification operations performed by the image classification device 100.

When the remote control 197 receives a user operation indicating to start image group classification operations, the image classification device 100 starts processing for image group classification operations.

Upon the start of processing for image group classification operations, the image group data reception unit 201 begins to read images in one image group, and the image group information reception unit 211 begins to receive the name of the image group (step S700).

The image group data reception unit 201 reads images from an external recording medium mounted in the external recording medium reading/writing device 140, from an external device via the USB cable 195 connected to the USB control device 150, or from the communication device 180 connected to the network 194.

In this embodiment, the image group data reception unit 201 reads, from the external recording medium reading/writing device 140, images included in an image group recorded in the SD memory card 191 that is an external storage medium.

The image group data reception unit 201 reads images recorded on the SD memory card 191 one by one, assigning an image ID sequentially to the read images and using the image reading/writing unit to write the images to the real data storage directory 324 of the image storage unit 231.

In response to user operation of the remote control 197, the image group information reception unit 211 receives the name of the event group.

After writing of all of the images included in the image group into the image storage unit 231, the image feature calculation control unit 221 uses the image reading/writing unit 202 to read, one by one, images belonging to the image group received by the image group data reception unit 201 (step S705).

By referring to the stored face models, the facial feature value extraction unit 222 attempts to recognize any faces included in an image read by the image feature calculation control unit 221, calculating the number of recognized faces and the ratio of the area of the recognized faces as the facial feature values (step S710).

Upon calculation of the facial feature values by the facial feature value extraction unit 222, the color feature value extraction unit 223 determines the color of each pixel included in an image based on the brightness of each color component in the pixel. The color feature value extraction unit 223 calculates, for each of the determined colors, the ratio of the number of pixels of the determined color to the total number of pixels in the image (step S715).

Upon calculation of the color feature values by the color feature value extraction unit 223, the object feature value extraction unit 224 attempts to recognize any objects included in an image by referring to the stored object models. When successfully recognizing an object, the object feature value extraction unit 224 calculates the name of the recognized object as the object feature values (step S720).

Subsequently, the image feature calculation control unit 221 calculates the image feature information based on the calculated facial feature values, color feature values, and object feature values, using the image feature information reading/writing unit 203 to write the calculated image feature information in the image feature information storage unit 232 (step S725).

When the image feature calculation control unit 221 has not completed calculation of image feature information for all of the images in an image group received by the image group data reception unit 201 (step S730: No), the processing in step S705 starts again for an image for which calculation of image feature information is not complete.

When the image feature calculation control unit 221 has completed calculation of image feature information for all of the images in an image group received by the image group data reception unit 201 (step S730: Yes), the image group feature calculation unit 206 uses the image feature information reading/writing unit 203 to read, from the image feature information storage unit 232, all of the pieces of image feature information corresponding to the images belonging to the image group read by the image group data reception unit 201.

Upon reading of all of the pieces of image feature information corresponding to the images belonging to an image group, the image group feature calculation unit 206 calculates facial feature values for the image group (step S735). The facial feature values include the following: face IDs composed of the ID of each recognized face in the images belonging to the image group; the overall maximum facial area, which is the largest among the maximum facial areas of the images belonging to the image group; the total number of faces, which is the sum of each number of faces in the images belonging to the image group; the number of images with faces, which is the number of images that include a recognized face; and the maximum number of faces, which is the largest of the numbers of faces in the images belonging to the image group.

Furthermore, the image group feature calculation unit 206 calculates the average value of the color feature values for each color of the images belonging to the image group, taking the calculated average value for each color to be the color feature value averages for the image group (step S740). The image group feature calculation unit 206 then calculates the object feature values for the image group, which are composed of the name of each object recognized in the images belonging to the image group (step S745).

Subsequently, the image group feature calculation unit 206 uses the calculated facial feature values for the image group, the calculated color feature value averages for the image group, the calculated object feature values, and the name of the image group received by the image group information reception unit 211 to calculate the image group feature information. The image group feature calculation unit 206 then uses the image group feature information reading/writing unit 204 to write the calculated image group feature information in the image group feature information storage unit 233 (step S750).

The image group classification unit 208 reads, via the image group feature information reading/writing unit 204, the image group feature information that has just been written and reads, via the event feature information reading/writing unit 209, the event feature information recorded in the event feature information storage unit 234.

Furthermore, the image group classification unit 208 compares the read image group feature information and the event feature information (step S755). When finding elements of the image group feature information that satisfy a standard that represents event feature information, the image group classification unit 208 classifies the image group corresponding to the read image group feature information as an event corresponding to the satisfied standard.

When not finding a corresponding piece of event feature information, the image group classification unit 208 determines that the image group corresponding to the read image group feature information is to be classified into the category "other event".

Upon determining the event into which the image group is to be classified, the image group classification unit 208 classifies the image group as follows: the image group classification unit 208 creates, via the image reading/writing unit 202, an image group directory with the same name as the image group within the event directory in the image storage unit 231 corresponding to the event into which the image group is classified. The image group classification unit 208 then stores, via the image reading/writing unit 202, information in the image group directory indicating the addresses of data for all of the images included in the image group, thus creating a link to the data for all of the images included in the image group (step S760).

Subsequently, the classification result output unit 210 displays, on the display 193, the event name of the event into which the image group is to be classified as calculated by the image group classification unit 208, together with the name of the image group received by the image group information reception unit 211. The image classification device 100 then ends image group classification operations.

Specific Example of Image Group Classification Operations

With reference to the figures, the following describes a specific example of image group classification operations, focusing in particular on processing to classify an image group performed by the image group classification unit 208 in steps S755 and S760.

Figure 8A:
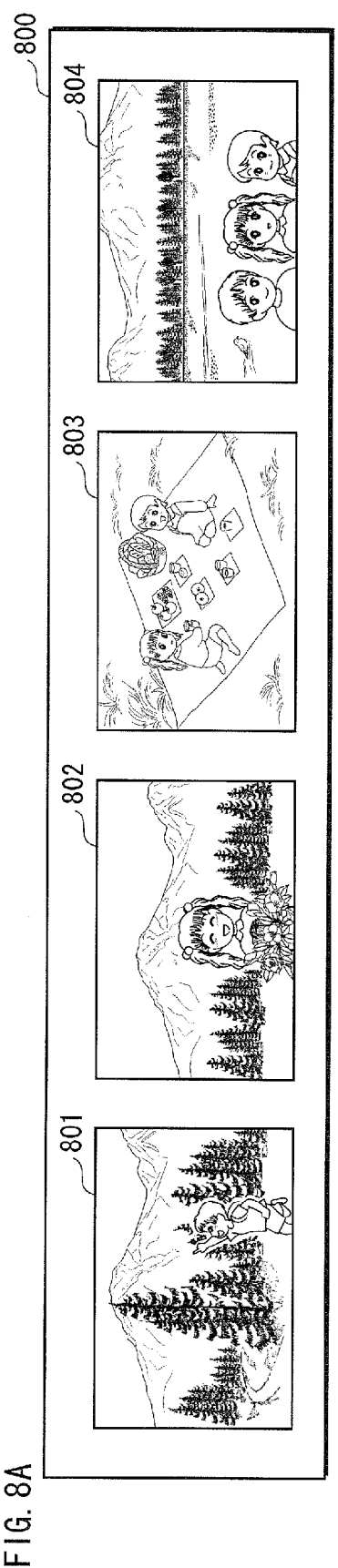
FIGS. 8A, 8B, and 8C show images belonging to image groups.

FIG. 8A shows an image group 800 composed of images 801 to 804, which are photographs taken by the user. This image group 800 is, for example, an image group with a name of Hakone 2008 summer and has an image group ID of 0010.

Images 801 to 804 include many photographs taken in a forest, as well as one image, image 804, photographed by a lake. Since green leaves on the trees occupy a large area, a large amount of green is included among the colors in the images of the image group 800.

Figure 8B:
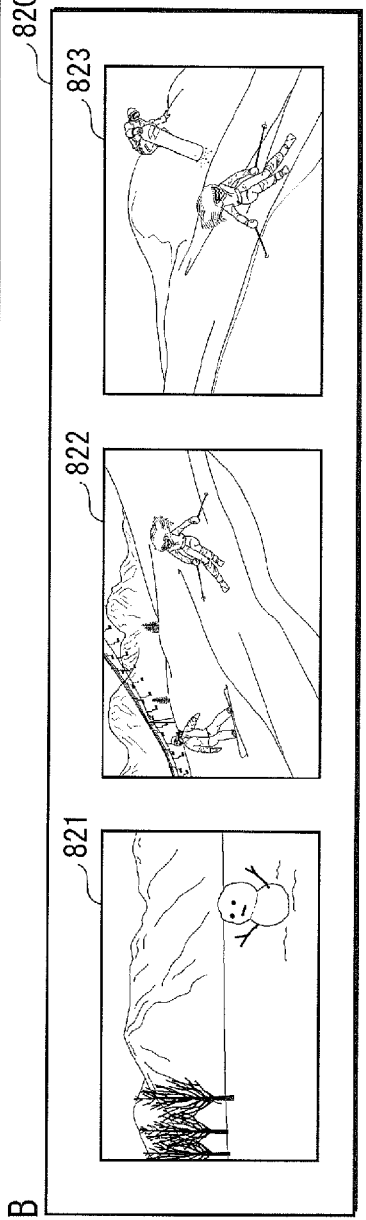

FIG. 8B shows an image group 820 composed of images 821 to 823, which are photographs taken by the user. The image group 820 is, for example, an image group with a name of Niseko 2009 winter and has an image group ID of 0011.

Since many of the photographs among the images 821 to 823 show a snow-covered ski resort in the background, a large amount of white is included among the colors in the images of the image group 820.

Figure 8C:
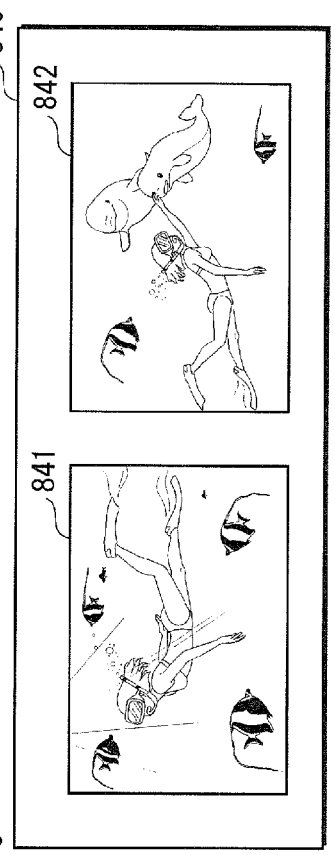

FIG. 8C shows an image group 840 composed of images 841 and 842, which are photographs taken by the user.

This image group 840 is, for example, an image group with a name of Miyakojima 2009 summer and has an image group ID of 0012.

Since the photographs in the images 841 and 842 were taken in the ocean, a large amount of blue is included among the colors in the images of the image group 840.

FIG. 9 illustrates the data structure of the pieces of image group feature information, stored in the image group feature information storage unit 233, that correspond to image groups with an image group ID of 0010, 0011, and 0012.

In step S755, upon reading the image group feature information with an image group ID of 0010 from the image group feature information storage unit 233, the image group classification unit 208 compares the image group feature information with an image group ID of 0010 with the event feature information read from the event feature information storage unit 234 (see FIG. 6).

The image group feature information with an image group ID of 0010 has a value of 0.4 for green 523 in the color feature value averages 502 and a value of seven for the total number of faces 533 in the facial feature values 503. Therefore, the image group classification unit 208 determines that the image group feature information with an image group ID of 0010 corresponds to the standard 601 of "green 0.4 or greater 604" and the standard 601 of "five people or more 606". The image group classification unit 208 thus calculates that the image group with an image group ID of 0010 is to be classified as a picnic event and a large group event as shown in FIG. 6.

Subsequently, the image group classification unit 208 creates an image group directory with the name "Hakone 2008 summer" within the event directory "picnic event directory 322" in the image storage unit 231 via the image reading/writing unit 202. The image group classification unit 208 then creates a link, via the image reading/writing unit 202, to the image data corresponding to the images 801 to 804 in the directory "Hakone 2008 summer" that has been created.

The image group classification unit 208 also creates an image group directory with the name "Hakone 2008 summer" within the event directory "large group" (not shown in the figures) in the image storage unit 231 via the image reading/writing unit 202. The image group classification unit 208 then creates a link, via the image reading/writing unit 202, to the image data corresponding to the images 801 to 804 in the directory "Hakone 2008 summer" that has been created.

In step S755, upon reading the image group feature information with an image group ID of 0011 from the image group feature information storage unit 233, the image group classification unit 208 compares the image group feature information with an image group ID of 0011 with the event feature information read from the event feature information storage unit 234.

The image group feature information with an image group ID of 0011 has a value of 0.5 for white 524 in the color feature value averages 502 and a value of four for the total number of faces 533 in the facial feature values 503. Therefore, the image group classification unit 208 determines that the image group with an image group ID of 0010 corresponds to the standard 601 of "white 0.4 or greater 605" and the standard 601 of "four people or fewer 607". The image group classification unit 208 thus calculates that the image group with an image group ID of 0011 is to be classified as a skiing event and a small group event.

Subsequently, the image group classification unit 208 creates an image group directory with the name "Niseko 2009 winter" within the event directory "ski event directory 323" in the image storage unit 231 via the image reading/writing unit 202. The image group classification unit 208 then creates a link, via the image reading/writing unit 202, to the image data corresponding to the images 821 to 823 in the directory "Niseko 2009 winter" that has been created.

The image group classification unit 208 also creates an image group directory with the name "Niseko 2009 winter" within the event directory "small group" (not shown in the figures) in the image storage unit 231 via the image reading/writing unit 202. The image group classification unit 208 then creates a link, via the image reading/writing unit 202, to the image data corresponding to the images 821 to 823 in the directory "Niseko 2009 winter" that has been created.

In step S755, upon reading the image group feature information with an image group ID of 0012 from the image group feature information storage unit 233, the image group classification unit 208 compares the image group feature information with an image group ID of 0012 with the event feature information read from the event feature information storage unit 234.

The image group feature information with an image group ID of 0012 has a value of 0.8 for blue 522 in the color feature value averages 502 and a value of two for the total number of faces 533 in the facial feature values 503. Therefore, the image group classification unit 208 determines that the image group feature information with an image group ID of 0012 corresponds to the standard 601 of "blue 0.4 or greater 603" and the standard 601 of "four people or fewer 607" (see FIG. 6). The image group classification unit 208 thus calculates that the image group with an image group ID of 0012 is to be classified as a scuba diving event and a small group event.

Subsequently, the image group classification unit 208 creates an image group directory with the name "Miyakojima 2009 summer" within an event directory "scuba diving" in the image storage unit 231 via the image reading/writing unit 202. The image group classification unit 208 then creates a link, via the image reading/writing unit 202, to the image data corresponding to the images 841 and 842 in the directory "Miyakojima 2009 summer" that has been created.

The image group classification unit 208 also creates an image group directory with the name "Miyakojima 2009 summer" within the event directory "small group" (not shown in the figures) in the image storage unit 231 via the image reading/writing unit 202. The image group classification unit 208 then creates a link, via the image reading/writing unit 202, to the image data corresponding to the images 841 and 842 in the directory "Miyakojima 2009 summer" that has been created.

Next, event feature information generation operations by the image classification device 100 are described with reference to the figures.

Event Feature Information Generation Operations

Figure 10:
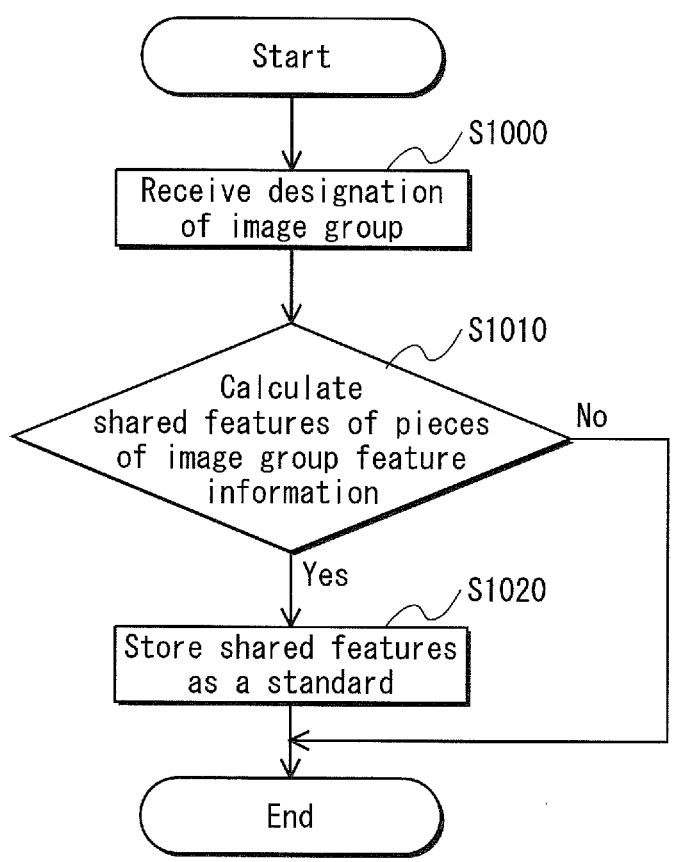
FIG. 10 is a flowchart of event feature information generation operations performed by the image classification device 100.

FIG. 10 is a flowchart of event feature information generation operations performed by the image classification device 100.

Event feature information generation operations start when the remote control 197 receives a user operation indicating to start event feature information generation operations.

When event feature information generation operations start, the image group information reception unit 211 receives a user designation of image group IDs (step S1000). The event information reception unit 212 receives an event name corresponding to the event feature information being newly created.

The image group feature calculation unit 206 uses the image group feature information reading/writing unit 204 to read, from the image group feature information storage unit 233, pieces of image group feature information corresponding to the received image group IDs, transmitting the read pieces of image group feature information to the event feature calculation unit 207.

The event feature calculation unit 207 attempts to calculate features shared by the received pieces of image group feature information (step S1010).

In this context, calculation by the event feature calculation unit 207 of shared features is performed by, for example, designating a color as a shared feature when the value of the color in the color feature value averages 502 of the image group feature information is 0.4 or greater for all of the image groups.

In step S1010, if the same color (for example, color X) has a ratio of 0.4 or greater in the color feature value averages 502 in the image group feature information corresponding to all of the designated image groups (step S1010: Yes), then a new standard of "color X 0.4 or greater" is created as a standard 601, and the corresponding event name is set as the event name received by the event information reception unit 212.

The event feature calculation unit 207 associates the created standard with the event name and stores the combination in the event feature information storage unit 234 via the event feature information reading/writing unit 209 (step S1020).

When no shared feature is calculated in step S1010 (step S1010: No), or when the processing in step S1020 is complete, the image classification device 100 ends event feature information generation operations.

Specific Example of Event Feature Information Generation Operations

The following describes an example of event feature information generation operations with reference to the figures.

FIG. 11 illustrates the data structure of the pieces of image group feature information, stored in the image group feature information storage unit 233, that correspond to image groups with image group IDs of 0001 and 0010.

In step S1000, the image group information reception unit 211 receives a user designation of image group IDs 0001 and 0010. When the event information reception unit 212 receives the name "picnic", for example, as the event name corresponding to the image feature information to be newly created, the event feature calculation unit 207 receives the pieces of image group feature information, stored in the image group feature information storage unit 233, for the image group IDs 0001 and 0010.

Next, a specific example of event feature information generation operations is described with reference to FIG. 10.

The event feature calculation unit 207 attempts to calculate shared features from the received pieces of image group feature information (step S1010). Since the ratio of green 523 among the color feature value averages 502 for the image group feature information with an image group ID of 0001 is 0.4 and the ratio of green 523 among the color feature value averages 502 for the image group feature information with an image group ID of 0010 is also 0.4 (step S1010: Yes), the event feature calculation unit 207 calculates a standard of "green 0.4 or greater" as a shared feature.

Subsequently, the event feature calculation unit 207 associates the standard "green 0.4 or greater" with the event name "picnic" and stores the combination in the event feature information storage unit 234 via the event feature information reading/writing unit 209 (step S1020).

Upon completion of the processing in step S1020, the image classification device 100 ends the event feature information generation operations.

Embodiment 2

As an embodiment of an image classification device according to the present invention, the following describes an image classification device 1200, which is a modification to a portion of the image classification device 100 described in Embodiment 1, along with an additional function to determine whether recognized faces included in any of the stored images are family members, friends, or strangers.

The image group feature information stored in the image classification device 1200 includes facial feature values based on the determination of whether a face is a family member, friend, or stranger.

Structure

Hardware Structure of Image Classification Device 1200

The hardware structure of the image classification device 1200 is the same as the hardware structure of the image classification device 100. Accordingly, a description thereof is omitted.

Functional Structure of Image Classification Device 1200

Figure 12:
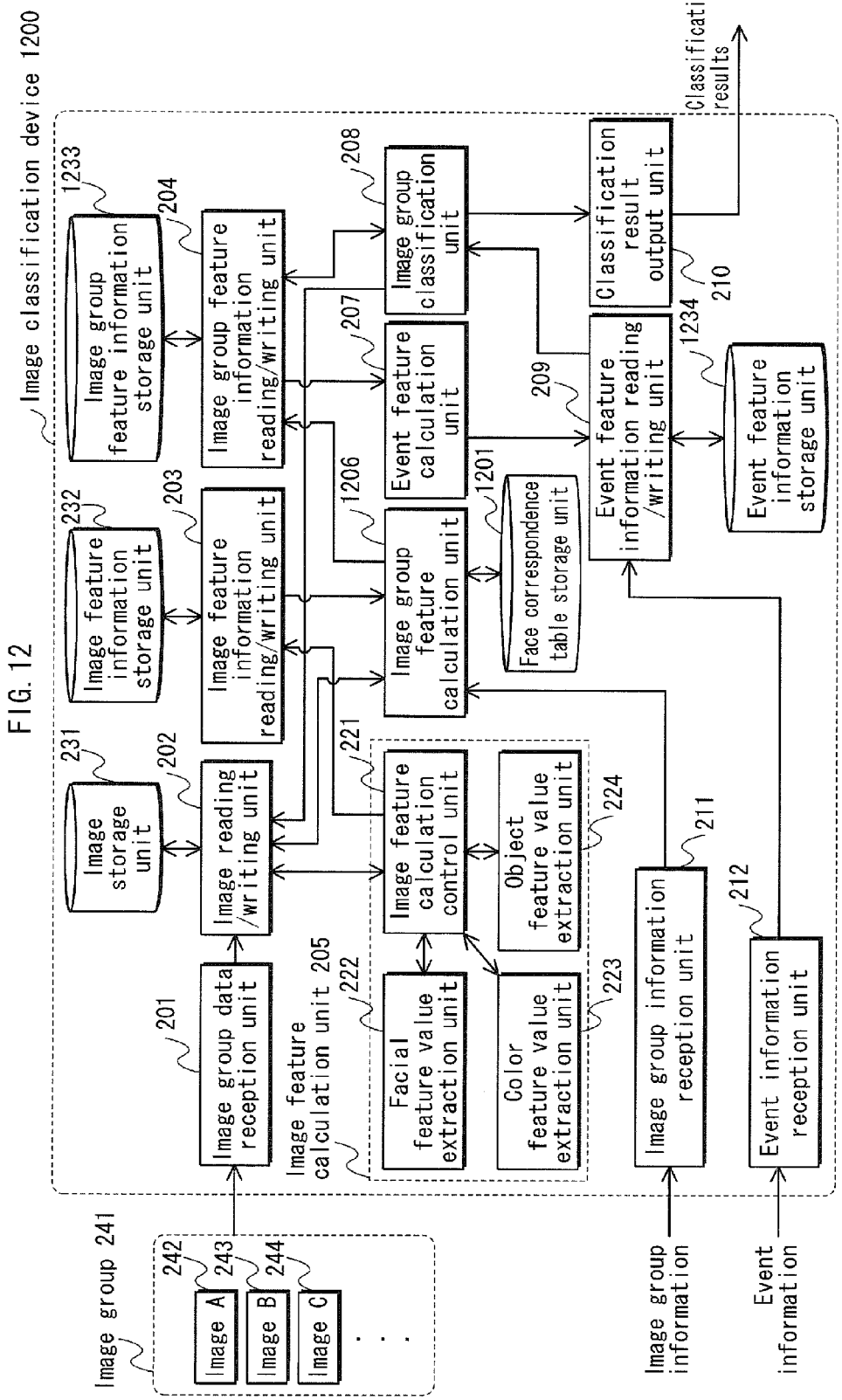
FIG. 12 is a functional block diagram showing the functional structure of an image classification device 1200.

FIG. 12 is a functional block diagram showing the main functional blocks of the image classification device 1200.

Differences from the image classification device 100 in Embodiment 1 are as follows. A face correspondence table storage unit 1201, which is a storage area for storing a face correspondence table (described below), is added. The image group feature information storage unit 233 is modified to an image group feature information storage unit 1233 for storing image group feature information whose components partially differ from those of the image group feature information in Embodiment 1. The event feature information storage unit 234 is modified to an event feature information storage unit 1234 for storing event feature information whose components partially differ from those of the event feature information in Embodiment 1. Finally, the image group feature calculation unit 206 is modified to an image group feature calculation unit 1206 that includes additional features (described below).

A description of components that are the same as the image classification device 100 in Embodiment 1 is omitted; rather, the following focuses on the above differences.

The image group feature calculation unit 1206 is modified from the image group feature calculation unit 206 in Embodiment 1 so as to newly include features such as a face sorting function, a face group determination function, a face correspondence table updating function, and a face correspondence table reading function.

The face sorting function is a function to extract facial features from recognized faces indicated by all of the face IDs included in the image feature information stored in the image feature information storage unit 232, sort the recognized faces based on the extracted facial features so that recognized faces determined to be of the same person are sorted into the same group, and provide each sorted group of recognized faces with a label for identifying the group.

Here, the facial features are, for example, a relative positional relation between parts of a human face such as eyes, nose, or mouth, and an area ratio of each of these parts.

The face group determination function is a function to determine whether a group of faces that are sorted by the face sorting function as being the same person represent a family member, a friend, or a stranger.

The standard for determining that recognized faces sorted as being the same person are a family member is that the recognized faces be found in a plurality of image groups.

The standard for determining that recognized faces sorted as being the same person are a friend is that the recognized faces are found only in one image group, and that the recognized faces occur at least twice.

The standard for determining that a recognized face sorted as being the same person is a stranger is that the recognized face not be determined to be a family member or friend, i.e. that the recognized face only occur once.

The face correspondence table updating function is a function to create, once the face sorting function and the face group determination function have been performed, a face correspondence table as described below based on the results of the face sorting function and the face group determination function and to update the face correspondence table stored in the face correspondence table storage unit 1201 with the created face correspondence table.

The face correspondence table reading function is a function to read the face correspondence table stored in the face correspondence table storage unit 1201.

The face correspondence table storage unit 1201 is a storage region for storing a face correspondence table and is implemented as a portion of the hard disk embedded within the hard disk device 130.

FIG. 13 shows the data structure of a face correspondence table stored in the face correspondence table storage unit 1201.

As shown in FIG. 13, the face correspondence table stored in the face correspondence table storage unit 1201 includes a label 1301, a determination result 1302, and face IDs 1303-1305. The label 1301 is for identifying a group of recognized faces sorted as being the same person. The determination result 1302 indicates the determination of whether the group of recognized faces sorted as being the same person is a family member, friend, or stranger. The face IDs 1303-1305 indicate the ID of the recognized faces belonging to the group of recognized faces sorted as being the same person.

For example, the group of recognized faces having a value of A for the label 1301 has been sorted as being faces of a family member. To this group belong recognized faces indicated by face ID 0001, face ID 0003, face ID 0101, etc.

FIG. 14 illustrates the data structure of the pieces of image group feature information stored in the image group feature information storage unit 1233.

As shown in FIG. 14, the pieces of image group feature information stored in the image group feature information storage unit 1233 include an image group ID 1401 indicating the corresponding image group, facial feature values 1402 indicating the features of any recognized faces in the images belonging to the corresponding image group, a total number of images 1403 indicating the number of images belonging to the corresponding image group, a group name 1404 indicating the name of the corresponding image group, and an event name 1405 indicating the name of the event into which the corresponding image group is classified.

The facial feature values 1402 include information on recognized faces of people determined to be family members (hereinafter referred to as "family members' faces"), information on recognized faces of people determined to be friends (hereinafter referred to as a "friends' faces"), and information on recognized faces of people determined to be strangers (hereinafter referred to as a "strangers' faces").

The information on family members' faces includes the following: family members' face IDs 1421, which are the face ID of each family member included in the images belonging to the corresponding image group; a maximum family member facial area 1422 indicating the family member's face, among family members' faces included in the images belonging to the corresponding image group, that has the largest facial area ratio; a maximum number of family members' faces 1423, which is the largest number of family members' faces included in one image; a family member's face image ratio 1424, which is the ratio of the number of images including a family member's face to the number of images belonging to the corresponding image group; a family member's face number ratio 1425, which is the average number of family members' faces included in one image; and a family member facial area ratio 1426, which is the maximum family member facial area ratio, i.e. the largest facial area ratio among the family members' faces in the images, divided by the number of images that include a family member's face.

If no family member's face is included in the images belonging to the image group, the family members' face IDs 1421 are null, and the maximum family member facial area 1422, the maximum number of family members' faces 1423, the family member's face image ratio 1424, the family member's face number ratio 1425, and the family member facial area ratio 1426 are all zero.

The information on friends' faces includes the following: friends' face IDs 1431, which are the face ID of each friend included in the images belonging to the corresponding image group; a maximum friend facial area 1432 indicating the friend's face, among friends' faces included in the images belonging to the corresponding image group, that has the largest facial area ratio; a maximum number of friends' faces 1433, which is the largest number of friends' faces included in one image; a friend's face image ratio 1434, which is the ratio of the number of images including a friend's face to the number of images belonging to the corresponding image group; a friend's face number ratio 1435, which is the average number of friends' faces included in one image; and a friend facial area ratio 1436, which is the maximum friend facial area ratio, i.e. the largest facial area ratio among the friends' faces in the images, divided by the number of images that include a friend's face.

If no friend's face is included in the images belonging to the image group, the friends' face IDs 1431 are null, and the maximum friend facial area 1432, the maximum number of friends' faces 1433, the friend's face image ratio 1434, the friend's face number ratio 1435, and the friend facial area ratio 1436 are all zero.

The information on strangers' faces includes the following: strangers' face IDs 1441, which are the face ID of each stranger included in the images belonging to the corresponding image group; a maximum stranger facial area 1442 indicating the stranger's face, among strangers' faces included in the images belonging to the corresponding image group, that has the largest facial area ratio; a maximum number of strangers' faces 1443, which is the largest number of strangers' faces included in one image; a stranger's face image ratio 1444, which is the ratio of the number of images including a stranger's face to the number of images belonging to the corresponding image group; a stranger's face number ratio 1445, which is the average number of strangers' faces included in one image; and a stranger facial area ratio 1446, which is the maximum stranger facial area ratio, i.e. the largest facial area ratio among the strangers' faces in the images, divided by the number of images that include a stranger's face.

If no stranger's face is included in the images belonging to the image group, the strangers' face IDs 1441 are null, and the maximum stranger facial area 1442, the maximum number of strangers' faces 1443, the stranger's face image ratio 1444, the stranger's face number ratio 1445, and the stranger facial area ratio 1446 are all zero.

For example, the facial feature values 1402 corresponding to the image group with an image group ID of 0020 indicate the following: faces with family members' face IDs 0001 and 0002 have been recognized, the maximum family member facial area is 40%, the maximum number of family members' faces is 2, the family member's face image ratio is 100%, the family member's face number ratio is 1.5, and the family member facial area ratio is 30%. The facial feature values 1402 also indicate that no face of a friend or stranger is found in the image group.

FIG. 15 shows the data structure of event feature information stored in the event feature information storage unit 1234.

As shown in FIG. 15, the event feature information is composed of a pair of a standard 1501 indicating the standard for classifying image groups and an event name 1511 indicating the event into which image groups are classified by the standard 1501.

The following describes pairs of a standard 1501 and an event name 1511.

The pair of the standard "family member facial area ratio of 0.1 or greater" and the event name "birthday party" indicates that the standard for classification of an event as a "birthday party" is that the family member facial area ratio 1426 be 10% or greater.

This standard is based on the assumption that celebrations of a family member's birthday are common, and that the face of the family member whose birthday is being celebrated is often photographed up-close.

The pair of the standard "non-family member's face image ratio of less than 0.5, non-family member's face number ratio of less than 1, and maximum number of non-family members' faces of less than 3" and the event name "insect collecting" indicates that the standard for classification of an event as "insect collecting" is that the non-family member's face image ratio be less than 50%, the non-family member's face number ratio be less than 1, and maximum number of non-family members' faces be less than 3.

This standard is based on the assumption that during insect collecting, the subject of photography is often insects or background vegetation, and that while family members may be included in the subject of photography, non-family members are unlikely to be included in the subject of photography.

The pair of the standard "non-family member's face image ratio of 0.8 or greater, non-family member's face number ratio of 1.5 or greater, and maximum number of non-family members' faces of 3 or greater" and the event name "sports day" indicates that the standard for classification of an event as a "sports day" is that the non-family member's face image ratio be 80% or greater, the non-family member's face number ratio be 1.5 or greater, and maximum number of non-family members' faces be 3 or greater.

This standard is based on the assumption that a sports day is an event held at school, and therefore while a family member may be included in as the subject of photography, many non-family members, such as school classmates, are also photographed.

The following describes the operations of the image classification device 1200 having the above structure.

Operations

In addition to the main operations performed by the image classification device 100 of Embodiment 1, the main operations of the image classification device 1200 are face correspondence table generation operations to extract facial features from recognized faces indicated by all of the face IDs included in the image feature information stored in the image feature information storage unit 232, provide each face that is determined, based on the extracted facial features, to be the same person with the same label, generate a face correspondence table by determining whether each group of faces with the same label represents a family member, a friend, or a stranger, and update the face correspondence table stored in the face correspondence table storage unit 1201 with the generated face correspondence table.

Furthermore, image group classification operations, which are some of the main operations of the image classification device 1200, are a partial modification of operations by the image classification device 100 in Embodiment 1.

The following describes these operations with reference to the figures.

Face Correspondence Table Generation Operations

FIG. 16 is a flowchart of face correspondence table generation operations performed by the image classification device 1200.

During image group classification operations, the image classification device 1200 starts face correspondence table generation operations when an image read by the image group data reception unit 201 is recorded in the image storage unit 231 and the corresponding image feature information is recorded in the image feature information storage unit 232.

Upon the start of face correspondence table generation operations, the image group feature calculation unit 1206 reads, via the image feature information reading/writing unit 203, all of the pieces of image feature information recorded in the image feature information storage unit 232.

The image group feature calculation unit 1206 extracts, from all of the read pieces of image feature information, the face ID of each recognized face, coordinates of a region of the face specified by the face ID, and an image ID corresponding to the image feature information that includes the face ID (step S1600).

The image group feature calculation unit 1206 uses the image reading/writing unit 202 to read, from the image storage unit 231, the image specified by the image ID included in the piece of image feature information that includes the face ID and extracts facial features from the entire region of the face specified by the coordinates of the face corresponding to the extracted face ID (step S1603).

The image group feature calculation unit 1206 then determines that, among the extracted facial features, a group of recognized faces having the same facial features represents the face of the same person, sorts recognized faces so that recognized faces determined as representing the same person belong to the same group, and provides each group of recognized faces thus sorted with a label for identifying the group (step S1605).

Subsequently, the image group feature calculation unit 1206 selects one image group (step S1610), selects one label among label provided to recognized faces included in the image group (step S1615), and searches other image groups for any recognized faces provided with the selected label (step S1620).

As a result of searching, if the recognized face provided with the selected label is found in another image group (step S1620: Yes), the image group feature calculation unit 1206 determines that the recognized face provided with the selected label and sorted as being the same person is a family member (step S1625).

In step S1620, as a result of searching, if the recognized face provided with the selected label is not found in another image group (step S1620: No), the image group feature calculation unit 1206 further determines whether the recognized face provided with the selected label occurs multiple times (step S1630).

As a result of searching, if the recognized face provided with the selected label occurs multiple times (step S1630: Yes), the image group feature calculation unit 1206 determines that the recognized face provided with the selected label and sorted as being the same person is a friend (step S1635).

In step S1630, as a result of searching, if the recognized face provided with the selected label only occurs once (step S1630: No), the image group feature calculation unit 1206 determines that the recognized face provided with the selected label is a stranger (step S1640).

When the processing in step S1625 is complete, the processing in step S1635 is complete, or the processing in step S1640 is complete, the image group feature calculation unit 1206 verifies whether any unselected label remains among labels of the selected image group (step S1645). If any unselected label remains (step S1645: No), the image classification device 1200 repeats the processing from step S1615 through step S1645: No until no unselected label remains.

In step S1645, when no unselected label remains (step S1645: Yes), the image group feature calculation unit 1206 verifies whether any unselected image group remains (step S1650). If any unselected image group remains (step S1650: No), the image classification device repeats the processing from step S1610 through step S1650: No until no unselected image group remains.

In step S1650, when no unselected image group remains (step S1640: Yes), the image feature information storage unit 232 creates a face correspondence table associating, for each label, the following: the label, the determination result indicating whether the group of faces sorted as having the same label represents a family member, a friend, or a stranger, and the face ID to which the label is provided. The image feature information storage unit 232 then updates the face correspondence table stored in the face correspondence table storage unit 1201 with the created face correspondence table (step S1655).

Upon completion of the processing in step S1655, the image classification device 1200 ends the face correspondence table generation operations.

The following is a supplementary explanation, using a specific example, of cases when the group of recognized faces sorted as being the same person represents a family member, a friend, and a stranger.

Figure 17:
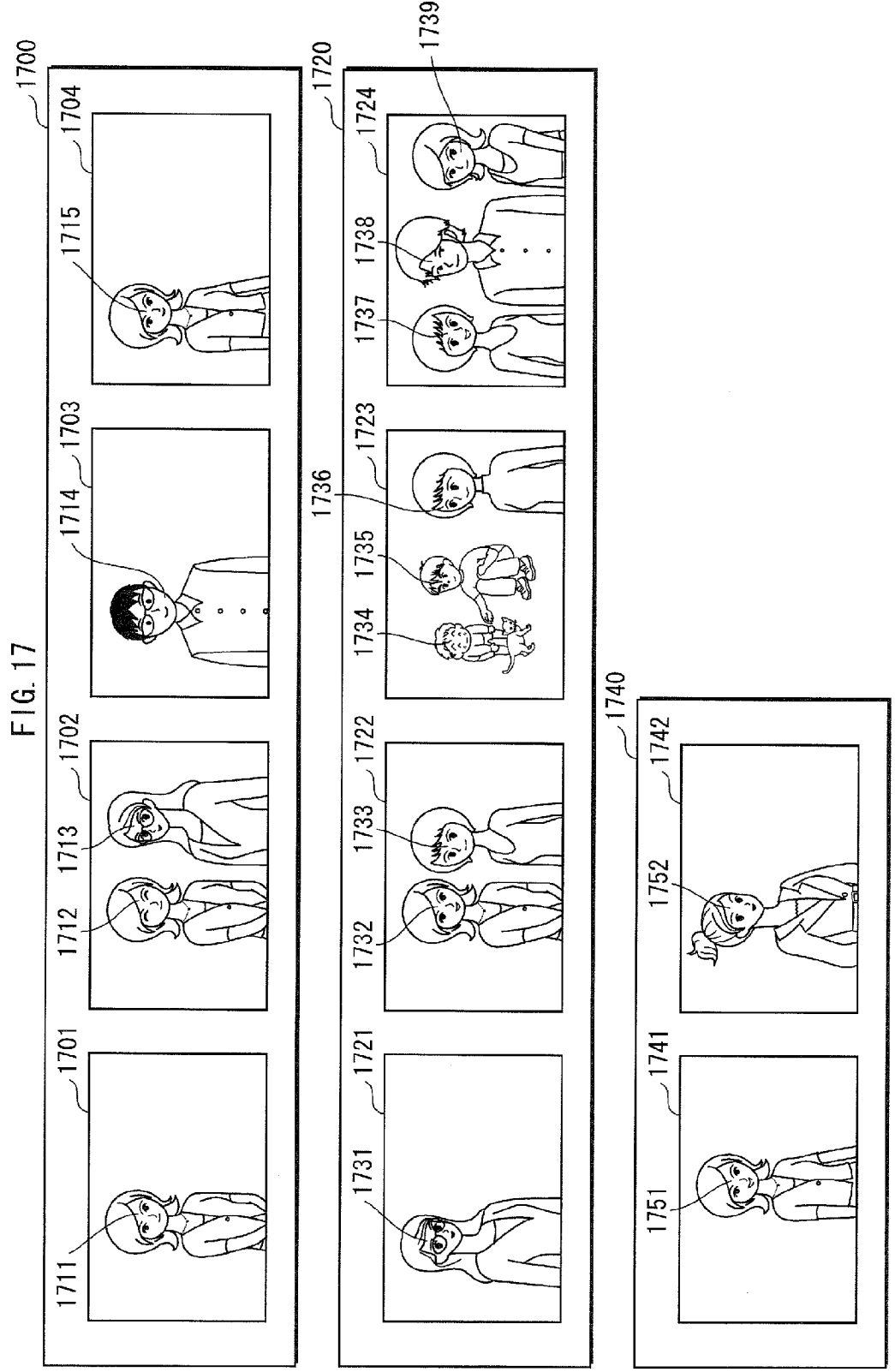
FIG. 17 shows images belonging to image groups.

FIG. 17 shows images belonging to an image group 1700, an image group 1720, and an image group 1740.

Images 1701 to 1704 belong to the image group 1700. Images 1721 to 1724 belong to the image group 1720. Images 1741 and 1742 belong to the image group 1740.

Among the recognized faces included in the images, faces 1711, 1712, 1715, 1732, 1739, and 1751 are recognized faces determined by the image group feature calculation unit 1206 to be the same person. These faces are provided with label E, for example.

Among the recognized faces included in the images, faces 1713 and 1731 are recognized faces determined by the image group feature calculation unit 1206 to be the same person. These faces are provided with label F, for example.

Among the recognized faces included in the images, faces 1733, 1736, and 1737 are recognized faces determined by the image group feature calculation unit 1206 to be the same person. These faces are provided with label G, for example.

Among the recognized faces included in the images, faces 1714, 1734, 1735, 1738, and 1752 are each recognized faces sorted by the image group feature calculation unit 1206 as being the same person. These faces, however, are not found in any other image.

Hereinafter, it is assumed that the only images stored by the image classification device 1200 are the images 1701 to 1704, images 1721 to 1724, and images 1741 and 1742.

Since the recognized faces provided with the label E are included in the image group 1700, the image group 1720, and the image group 1740, the image group feature calculation unit 1206 determines that these faces represent a family member.

Since the recognized faces provided with the label F are included in the image group 1700 and the image group 1720, the image group feature calculation unit 1206 determines that these faces represent a family member.

Since the recognized faces provided with the label G only occur within the image group 1720, and since multiple faces are sorted as being the same person, the image group feature calculation unit 1206 determines that these faces represent a friend.

Since the faces 1714, 1734, 1735, 1738, and 1752 are recognized faces which the image group feature calculation unit 1206 has sorted as being the same person yet do not occur in any other images, the image group feature calculation unit 1206 determines that these faces represent strangers.

Next, image group classification operations by the image classification device 1200 are described with reference to the figures.

Image Group Classification Operations

Figure 18:
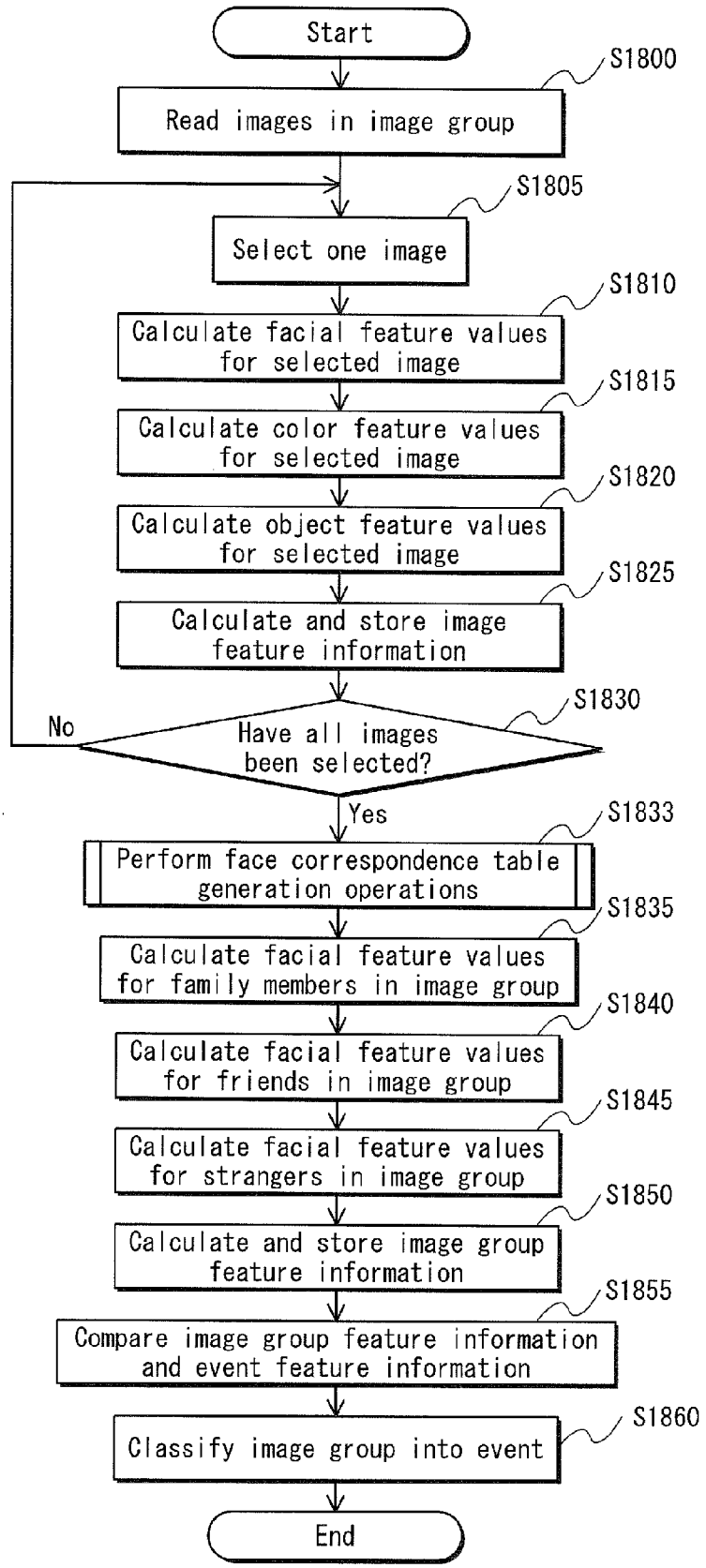
FIG. 18 is a flowchart of image group classification operations performed by the image classification device 1200.

FIG. 18 is a flowchart of image group classification operations performed by the image classification device 1200.

When the remote control 197 receives a user operation indicating to start image group classification operations, the image classification device 1200 starts image group classification operations.

The operations from step S1800 to step S1830: Yes are the same as the operations from step S700 to step S730: Yes (see FIG. 7) during image group classification operations performed by the image classification device 100 of Embodiment 1. Therefore, a description thereof is omitted.

In step S1830, when calculation of image feature information is complete for all of the images received by the image group data reception unit 201 (step S1830: Yes), the image classification device 1200 performs the above face correspondence table generation operations (step S1833).

Upon completion of the face correspondence table generation operations, the image group feature calculation unit 1206 uses the image feature information reading/writing unit 203 to read, from the image feature information storage unit 232, all of the pieces of image feature information corresponding to the images belonging to the image group read by the image group data reception unit 201.

Upon reading of all of the pieces of image feature information corresponding to the images belonging to an image group, the image group feature calculation unit 1206 calculates family members' facial feature values for the image group while referring to the face correspondence table stored in the face correspondence table storage unit 1201 (step S1835). The family members' facial feature values include the following: family members' face IDs 1421, which are the face ID of each family member included in the images belonging to the corresponding image group; a maximum family member facial area 1422 indicating the family member's face, among family members' faces included in the images belonging to the corresponding image group, that has the largest facial area ratio; a maximum number of family members' faces 1423, which is the largest number of family members' faces included in one image; a family member's face image ratio 1424, which is the ratio of the number of images including a family member's face to the number of images belonging to the corresponding image group; a family member's face number ratio 1425, which is the average number of family members' faces included in one image; and a family member facial area ratio 1426, which is the maximum family member facial area ratio, i.e. the largest facial area ratio among the family members' faces in the images, divided by the number of images that include a family member's face.

Next, the image group feature calculation unit 1206 calculates friends' facial feature values for the image group while referring to the face correspondence table stored in the face correspondence table storage unit 1201 (step S1840). The friends' facial feature values include the following: friends' face IDs 1431, which are the face ID of each friend included in the images belonging to the corresponding image group; a maximum friend facial area 1432 indicating the friend's face, among friends' faces included in the images belonging to the corresponding image group, that has the largest facial area ratio; a maximum number of friends' faces 1433, which is the largest number of friends' faces included in one image; a friend's face image ratio 1434, which is the ratio of the number of images including a friend's face to the number of images belonging to the corresponding image group; a friend's face number ratio 1435, which is the average number of friends' faces included in one image; and a friend facial area ratio 1436, which is the maximum friend facial area ratio, i.e. the largest facial area ratio among the friends' faces in the images, divided by the number of images that include a friend's face.

Furthermore, the image group feature calculation unit 1206 calculates strangers' facial feature values for the image group while referring to the face correspondence table stored in the face correspondence table storage unit 1201 (step S1845). The strangers' facial feature values include the following: strangers' face IDs 1441, which are the face ID of each stranger included in the images belonging to the corresponding image group; a maximum stranger facial area 1442 indicating the stranger's face, among strangers' faces included in the images belonging to the corresponding image group, that has the largest facial area ratio; a maximum number of strangers' faces 1443, which is the largest number of strangers' faces included in one image; a stranger's face image ratio 1444, which is the ratio of the number of images including a stranger's face to the number of images belonging to the corresponding image group; a stranger's face number ratio 1445, which is the average number of strangers' faces included in one image; and a stranger facial area ratio 1446, which is the maximum stranger facial area ratio, i.e. the largest facial area ratio among the strangers' faces in the images, divided by the number of images that include a stranger's face.

Subsequently, the image group feature calculation unit 1206 uses the calculated family members' facial feature values, the calculated friends' facial feature values, the calculated strangers' facial feature values, and the name of the image group received by the image group information reception unit 211 to calculate the image group feature information. The image group feature calculation unit 206 then writes the calculated image group feature information in the image group feature information storage unit 1233 via the image group feature information reading/writing unit 204 (step S1850).

The image group classification unit 208 reads, via the image group feature information reading/writing unit 204, the image group feature information that has just been written and reads, via the event feature information reading/writing unit 209, the event feature information recorded in the event feature information storage unit 234.

Furthermore, the image group classification unit 208 calculates the event to which the image group corresponding to the image group feature information is to be classified by comparing the read image group feature information and the event feature information (step S1855) to search for a piece of event feature information that corresponds to the image group feature information.

When the image group classification unit 208 does not find any corresponding piece of event feature information, the image group classification unit 208 determines that the image group corresponding to the image group feature information is to be classified into the category "other event".

Upon determining the event into which the image group is to be classified, the image group classification unit 208 classifies the image group as follows: the image group classification unit 208 creates, via the image reading/writing unit 202, an image group directory with the same name as the image group within the event directory in the image storage unit 231 corresponding to the event into which the image group is classified. The image group classification unit 208 then creates a link in the image group directory to the images included in the image group (step S1860).

Subsequently, the classification result output unit 210 displays, on the display 193, the event name of the event into which the image group is to be classified as calculated by the image group classification unit 208. The image classification device 1200 then ends image group classification operations.

Specific Example of Image Group Classification Operations

With reference to the figures, the following describes a specific example of image group classification operations, focusing in particular on processing to classify an image group performed by the image group classification unit 208 in steps S1855 and S1860.

Figure 19:
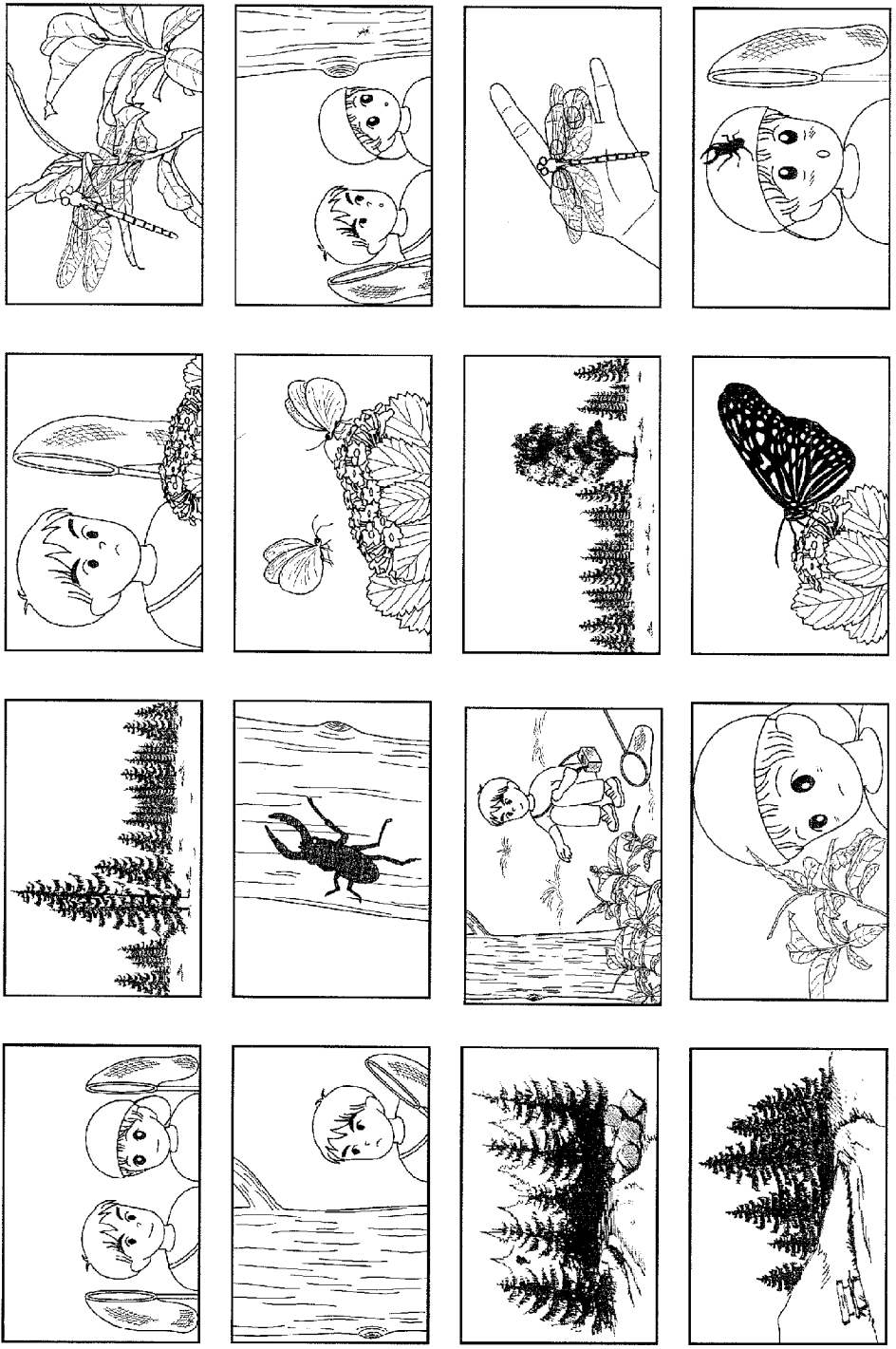
FIG. 19 shows images belonging to an image group.

FIG. 19 shows an image group 1900 composed of 16 images, which are photographs taken by the user.

This image group 1900 is, for example, an image group with a name of Mt. Kabuto insect collecting and has an image group ID of 0021.

Since insects are the subject of photography in many of these images, the number of people photographed is relatively low.

The image group feature information corresponding to the image group 1900 is, for example, the image group feature information with an image group ID 1401 of 0021 in FIG. 14.

In FIG. 14, the event name 1405 for the image group feature information with an image group ID 1401 of 0021 is "insect collecting"; however, until the event name is determined, the event name column is blank. The event name is only provided once the event name has been determined.

Figure 20:
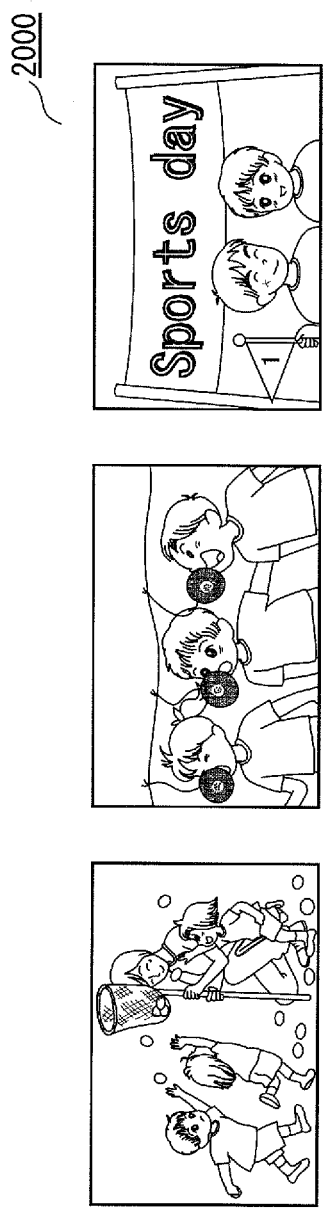
FIG. 20 shows images belonging to an image group.

FIG. 20 shows an image group 2000 composed of three images, which are photographs taken by the user.

This image group 2000 is, for example, an image group with a name of T River mini-sports day 2009 and has an image group ID of 0022.

Since many elementary school children are participating in the sports day that is the subject of photography, these images include a relatively large number of people.

The image group feature information corresponding to the image group 2000 is, for example, the image group feature information with an image group ID 1401 of 0022 in FIG. 14.

In FIG. 14, the event name 1405 for the image group feature information with an image group ID 1401 of 0022 is "sports day"; however, until the event name is determined, the event name column is blank. The event name is only provided once the event name has been determined.

Figure 21:
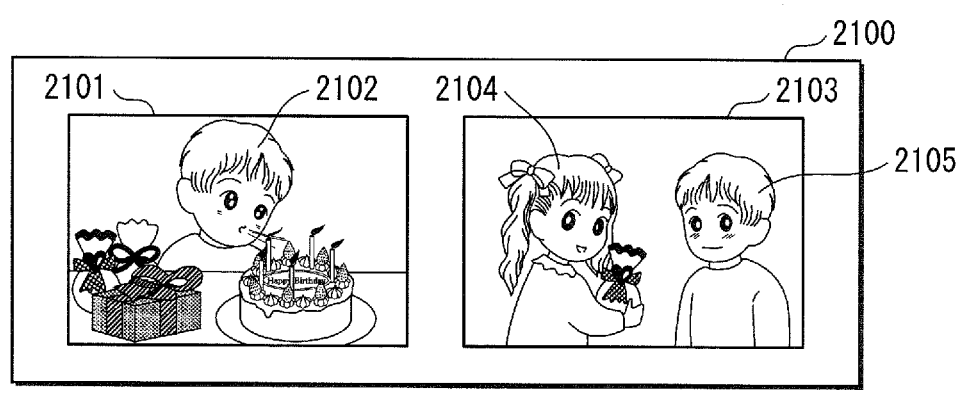
FIG. 21 shows images belonging to an image group.

FIG. 21 shows an image group 2100 composed of images 2101 and 2103, which are photographs taken by the user.

This image group 2100 is, for example, an image group with a name of boy A's third birthday and has an image group ID of 0020.

The recognized faces 2102 and 2104 are the same boy A. Images 2101 and 2103 are photographs taken at boy A's birthday party.

It is assumed here that the image group feature calculation unit 1206 determines boy A to be a family member.

Since these images are close-up photographs of boy A's face, these images are characterized by a large facial area ratio for the maximum facial area among the recognized faces included in the images.

The image group feature information corresponding to the image group 2100 is, for example, the image group feature information with an image group ID 1401 of 0020 in FIG. 14.

In FIG. 14, the event name 1405 for the image group feature information with an image group ID 1401 of 0022 is "boy A's third birthday"; however, until the event name is determined, the event name column is blank. The event name is only provided once the event name has been determined.

In step S1855, upon reading the image group feature information with an image group ID of 0021 from the image group feature information storage unit 233, the image group classification unit 208 compares the image group feature information with an image group ID of 0021 with the event feature information read from the event feature information storage unit 1234.

The image group feature information with an image group ID of 0021 indicates the following: the non-family member's face image ratio is a friends' face image ratio of 0.44, the non-family member's face number ratio is a friend's face number ratio of 0.56, and the maximum number of non-family members' faces is a maximum number of friends' faces of two. Therefore, it is determined that the image group feature information with an image group ID of 0021 corresponds to the standard 1501 in which the non-family member's face image ratio is less than 0.5, the non-family member's face number ratio is less than 1, and the maximum number of non-family members' faces is less than 3. It is thus determined that the image group with an image group ID of 0021 is to be classified as an "insect collecting" event.

Subsequently, the image group classification unit 208 creates an image group directory with the name "Mt. Kabuto insect collecting" within the event directory "insect collecting" in the image storage unit 231 via the image reading/writing unit 202. The image group classification unit 208 then creates a link, via the image reading/writing unit 202, to the image data of the images belonging to the image group ID 0021 in the directory "Mt. Kabuto insect collecting" that has been created.

In step S1855, upon reading the image group feature information with an image group ID of 0022 from the image group feature information storage unit 233, the image group classification unit 208 compares the image group feature information with an image group ID of 0022 with the event feature information read from the event feature information storage unit 1234.

The image group feature information with an image group ID of 0022 indicates the following: the non-family member's face image ratio is a stranger' face image ratio of 1, the non-family member's face number ratio is a stranger's face number ratio of 3, and the maximum number of non-family members' faces is a maximum number of strangers' faces of four. Therefore, it is determined that the image group feature information with an image group ID of 0022 corresponds to the standard 1501 in which the non-family member's face image ratio is 0.8 or greater, the non-family member's face number ratio is 1.5 or greater, and the maximum number of non-family members' faces is 3 or greater. It is thus determined that the image group with an image group ID of 0022 is to be classified as a "sports day" event.

Subsequently, the image group classification unit 208 creates an image group directory with the name "T River mini-sports day 2009" within the event directory "sports day" in the image storage unit 231 via the image reading/writing unit 202. The image group classification unit 208 then creates a link, via the image reading/writing unit 202, to the image data of the images belonging to the image group ID 0022 in the directory "T River mini-sports day 2009" that has been created.

In step S1855, upon reading the image group feature information with an image group ID of 0020 from the image group feature information storage unit 233, the image group classification unit 208 compares the image group feature information with an image group ID of 0020 with the event feature information read from the event feature information storage unit 1234.

The image group feature information with an image group ID of 0020 indicates that the family member facial area ratio is 0.3. Therefore, the image group classification unit 208 determines that the image group feature information with an image group ID of 0020 corresponds to the standard 1501 in which the family member facial area ratio is 0.1 or greater and determines that the image group with an image group ID of 0021 is to be classified as a "birthday party" event.

Subsequently, the image group classification unit 208 creates an image group directory with the name "boy A's third birthday" within the event directory "birthday party" in the image storage unit 231 via the image reading/writing unit 202. The image group classification unit 208 then creates a link, via the image reading/writing unit 202, to the image data of the images belonging to the image group ID 0020 in the directory "boy A's third birthday" that has been created.

Embodiment 3

As an embodiment of an image classification device according to the present invention, the following describes an image classification device 2200, which is a modification to a portion of the image classification device 100 described in Embodiment 1, that classifies image groups without using event feature information.

Structure

Hardware Structure of Image Classification Device 2200

The hardware structure of the image classification device 2200 is the same as the hardware structure of the image classification device 100. Accordingly, a description thereof is omitted.

Functional Structure of Image Classification Device 2200

Figure 22:
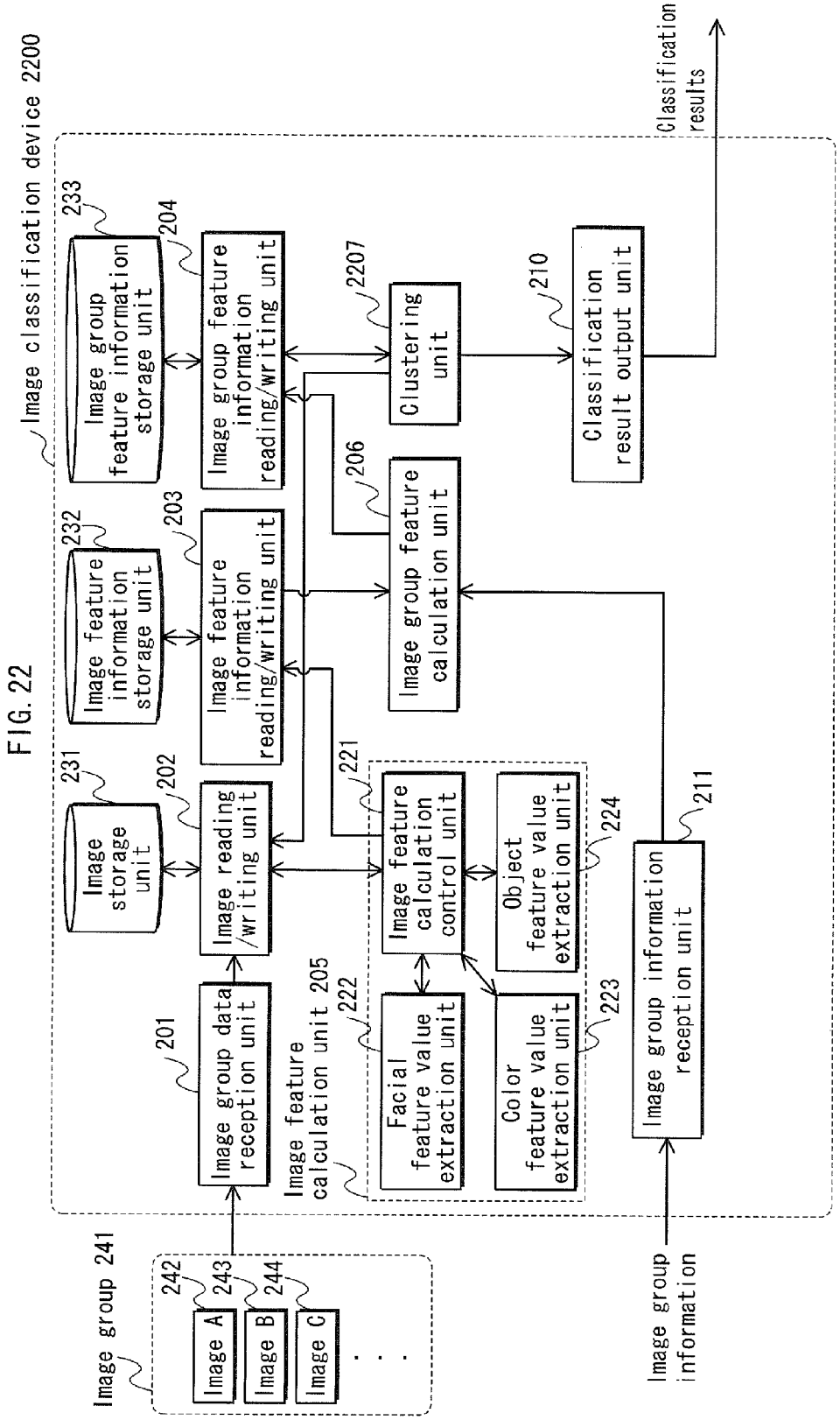
FIG. 22 is a functional block diagram showing the functional structure of an image classification device 2200.

FIG. 22 is a functional block diagram showing the main functional blocks of the image classification device 2200.

A difference from the image classification device 100 in Embodiment 1 is that the event information reception unit 212, the event feature calculation unit 207, the image group classification unit 208, the event feature information reading/writing unit 209, and the event feature information storage unit 234 are removed. Another difference is the addition of a clustering unit 2207 having a function to classify image groups based only on image group feature information.

A description of components that are the same as the image classification device 100 in Embodiment 1 is omitted; rather, the following focuses on the above differences.

The clustering unit 2207 connects with the image reading/writing unit 202, the image group feature information reading/writing unit 204, and the classification result output unit 210.

The clustering unit 2207 has a clustering function to read a plurality of pieces of image group feature information from the image group feature information storage unit 233 via the image group feature information reading/writing unit 204 and to classify the image groups corresponding to the read pieces of image group feature information into events based on the ratio of the number of pixels of each color in the color feature value averages included in the read pieces of image group feature information.

Details on the clustering function of the clustering unit 2207 are provided below within a description, with reference to the figures, of clustering operations.

With reference to the figures, the following describes the operations of the image classification device 2200 having the above structure.

Operations

Other than the operations described as the main operations performed by the image classification device of Embodiment 1, the main operations of the image classification device 2200 are clustering operations to classify image groups into events without using event feature information.

The clustering operations performed by the image classification device 2200 are operations whereby the clustering unit 2207 (1) classifies image groups into clusters of image groups having similar values for a certain color in the color feature value averages, (2) performs the same classification as in (1) for an unselected color within each resulting cluster, (3) repeats (2) until no unselected color remains, and (4) provides an event name to each cluster into which the image groups have been classified.

The following describes details on these clustering operations with reference to the figures.

Clustering Operations

Figure 23:
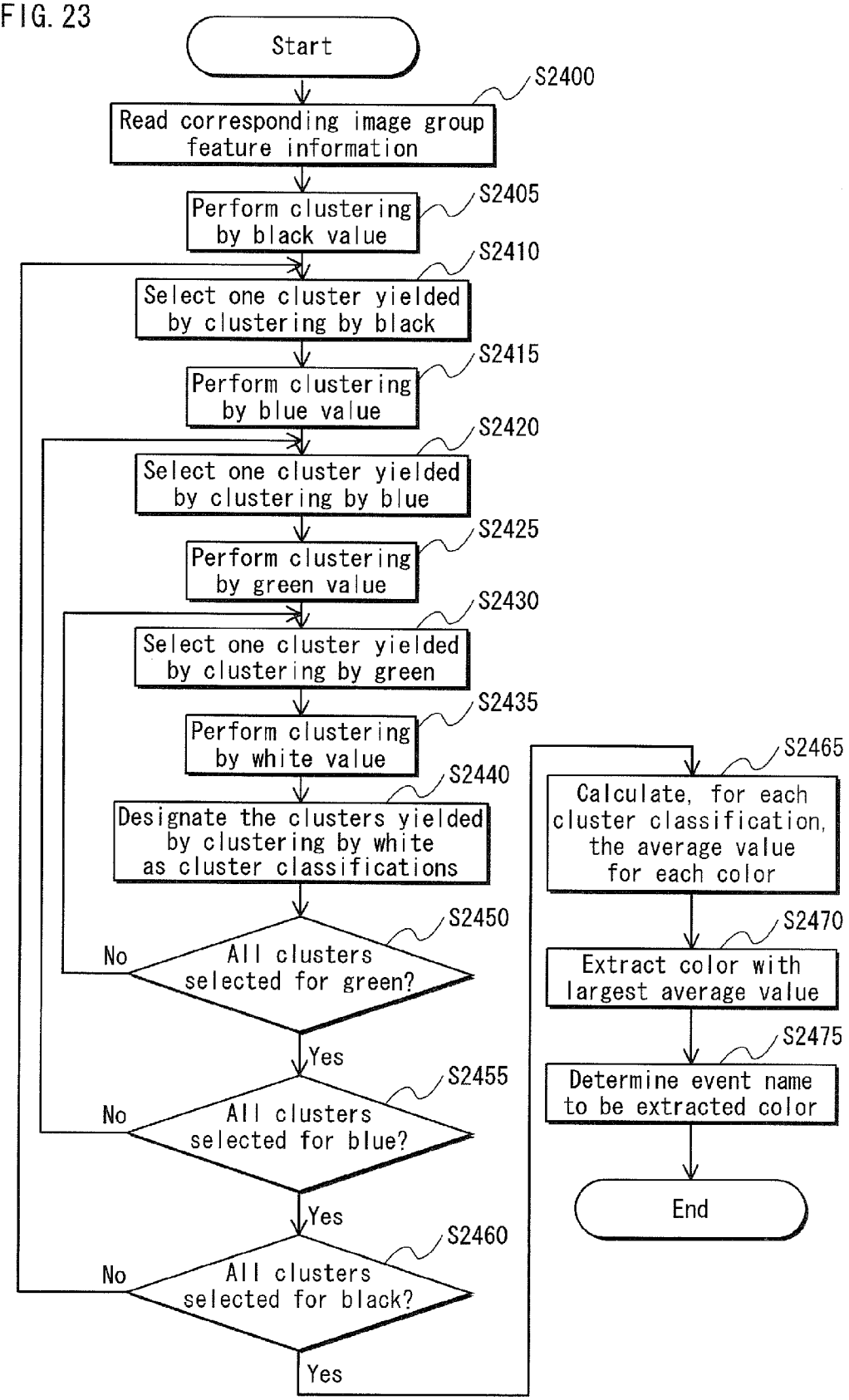
FIG. 23 is a flowchart of clustering operations performed by the image classification device 2200.

FIG. 23 is a flowchart of clustering operations performed by the image classification device 2200.

When the remote control 197 receives a designation of a plurality of image group IDs that indicate a plurality of image groups as the target of clustering operations, as well as a user operation indicating to start clustering operations, the image classification device 2200 starts processing for clustering operations.

Once clustering operations begin, the clustering unit 2207 reads pieces of image group feature information corresponding to the image group IDs designated by the user from the image group feature information storage unit 233 via the image group feature information reading/writing unit 204 (step S2400).

The clustering unit 2207 clusters the read pieces of image group feature information using, among the read pieces of image group feature information, the value of black in the color feature value averages (hereinafter referred to as clustering by black; step S2405).

Clustering by black refers to (1) identifying the smallest value among the values of black and then classifying, into a first cluster, image groups with a value for black of at least the minimum value and at most the minimum value+a clustering value (assumed in this case to be 0.25; hereinafter, "0.25" is indicated directly without reference to the "clustering value"), (2) identifying the largest value among the values of black and then classifying, into a second cluster, image groups with a value for black of at least the maximum value− 0.25, and (3) classifying, into a third cluster, image groups not classified into either the first cluster or the second cluster.

In this context, the clustering value is a reference value for determining whether color values (in this case, black) in the color feature value averages are similar. The clustering unit 2207 stores the clustering value in advance.

When clustering by black is complete, the clustering unit 2007 selects one cluster that was established during clustering by black (step S2410).

The clustering unit 2007 uses the value of blue in the color feature value averages among the pieces of image group feature information included in the selected cluster to cluster the pieces of image group feature information included in the selected cluster (hereinafter referred to as clustering by blue; step S2415).

This clustering by blue is similar to the above clustering by black, replacing "black" with "blue".

When clustering by blue is complete, the clustering unit 2007 selects one cluster that was established during clustering by blue (step S2420).

The clustering unit 2007 uses the value of green in the color feature value averages among the pieces of image group feature information included in the selected cluster to cluster the pieces of image group feature information included in the selected cluster (hereinafter referred to as clustering by green; step S2425).

This clustering by green is similar to the above clustering by black, replacing "black" with "green".

When clustering by green is complete, the clustering unit 2007 selects one cluster that was established during clustering by green (step S2430).

The clustering unit 2007 uses the value of white in the color feature value averages among the pieces of image group feature information included in the selected cluster to cluster the pieces of image group feature information included in the selected cluster (hereinafter referred to as clustering by white; step S2435). The clustering unit 2007 then designates the clusters thus classified as cluster classifications that are not to be clustered any further (step S2440).

This clustering by white is similar to the above clustering by black, replacing "black" with "white".

Upon completion of the processing in step S2240, the clustering unit 2207 determines whether any cluster that has not been selected exists among clusters that have been clustered by green (step S2450). If any unselected cluster exists (step S2450: Yes), the clustering unit 2207 selects one unselected cluster and repeats the processing from step S2430 through step S2450 until no unselected cluster remains.

In step S2450, if no cluster that has not been selected exists among clusters that have been clustered by green (step 2450: No), the clustering unit 2207 determines whether any cluster that has not been selected exists among clusters that have been clustered by blue (step S2455). If any unselected cluster exists (step S2455: Yes), the clustering unit 2207 selects one unselected cluster and repeats the processing from step S2420 through step S2455 until no unselected cluster remains.

In step S2455, if no cluster that has not been selected exists among clusters that have been clustered by blue (step 2455: No), the clustering unit 2207 determines whether any cluster that has not been selected exists among clusters that have been clustered by black (step S2460). If any unselected cluster exists (step S2460: Yes), the clustering unit 2207 selects one unselected cluster and repeats the processing from step S2410 through step S2460 until no unselected cluster remains.

In step S2460, if no cluster that has not been selected exists among clusters that have been clustered by black (step 2460: No), then every image group that is targeted for classification has been classified into a cluster classification.

Although clustering of image groups is therefore complete after the processing from step S2400 to step S2650: No, the clustering unit 2207 also performs the following processing in order to determine the event name for each cluster classification.

In step S2460, if no cluster that has not been selected exists among clusters that have been clustered by black (step 2460: No), the clustering unit 2207 calculates, for each cluster classification, the average value for each color in the image groups classified into the cluster classification (step S2465). Then, for each cluster classification, the clustering unit 2207 extracts the maximum average color value from among the calculated averages (step S2470).

Subsequently, the clustering unit 2207 determines that the event name for each cluster classification is the extracted maximum average color value for the cluster classification (step S2475). The image classification device 2200 then concludes clustering operations.

Specific Example of Clustering Operations

The following describes a specific example of clustering operations with reference to the figures.

FIG. 24 is a schematic diagram of clustering operations performed by the image classification device 2200.

FIG. 24 schematically shows how the clustering unit 2207 uses, among the pieces of image group feature information stored by the image group feature information storage unit, the color feature value averages 2301 for the image groups that are the target of clustering operations in order to classify the image groups that are the target of clustering operations into a black event 2302, a blue event 2303, a green event 2304, and a white event 2305.

With reference to FIG. 24, clustering into the above colors is described in detail.

First, the clustering unit 2207 performs clustering by black.

The smallest value among the black values in the color feature value averages 2301 is 0.0, which corresponds to the image group 1008. Therefore, the clustering unit 2207 classifies the image group feature information corresponding to image group ID 1001 (hereinafter referred to as image group 1001; the same holds in other cases as well), the image group 1001, the image group 1003, the image group 1005, the image group 1006, the image group 1007, and the image group 1008, which have a value of black that is at least 0.0 and at most 0.25, into a first black cluster, for example.

The maximum value among the black values in the color feature value averages 2301 is 0.6 for the image group 1002. Therefore, the clustering unit 2207 classifies the image group 1002 and the image group 1004, which have a value of black that is at least 0.35 and at most 0.6, into a second black cluster, for example.

In this example, no piece of image group information is classified into a third cluster.

Next, the clustering unit 2207 selects the first black cluster and performs clustering by blue.

The image group 1001, the image group 1003, the image group 1005, the image group 1006, the image group 1007, and the image group 1008 are classified into the first black cluster. The minimum value among the blue values in the color feature value averages 2301 for these image groups is 0.1 for the image group 1003, the image group 1006, and the image group 1008. Therefore, the clustering unit 2207 classifies the image group 1003, the image group 1006, the image group 1007, and the image group 1008, which have a value of blue that is at least 0.1 and at most 0.35, into a first blue cluster, for example.

For the image groups classified into the first black cluster, the maximum value among the blue values in the color feature value averages 2301 is 0.7 for the image group 1005. Therefore, the clustering unit 2207 classifies the image group 1001 and the image group 1005, which have a value of blue that is at least 0.45 and at most 0.7, into a second blue cluster, for example.

In this example, no image group is classified into a third cluster.

Clustering by black, blue, green, and white, is thus repeated. While details are omitted, all of the image groups are thus classified as follows: first cluster classification composed of image group ID 1006; second cluster classification composed of image group IDs 1003, 1007, and 1008; third cluster classification composed of image group IDs 1001 and 1005; and fourth cluster classification composed of image group IDs 1002 and 1004.

Since the color with the maximum average value in the first cluster classification is white, 0.7, the event name for the first cluster classification is a white event.

Since the color with the maximum average value in the second cluster classification is green, 0.63, the event name for the second cluster classification is a green event.

Since the color with the maximum average value in the third cluster classification is blue, 0.65, the event name for the third cluster classification is a blue event.

Since the color with the maximum average value in the fourth cluster classification is black, 0.5, the event name for the fourth cluster classification is a black event.

As shown in FIG. 23, the image classification device 2200 thus classifies each image corresponding to the image group ID 1001 through the image group ID 1008 into a black event 2302, a blue event 2303, a green event 2304, or a white event 2305.

Supplementary Description

While an example of performing image group classification operations, event feature information generation operations, face correspondence table generation operations, clustering operations, and the like has been described for embodiments of an image classification device according to the present invention, the image classification device may be modified as follows. The present invention is of course not limited to an image classification device exactly as described in the above embodiments.

(1) In Embodiment 1, the image classification device 100 stores therein an image as data encoded in the JPEG format. Alternatively, as long as a digital photograph can be stored as data, the digital photograph may be encoded in a format other than the JPEG format, such as the PNG (Portable Network Graphics) format or the GIF (Graphics Interchange Format), or the digital photograph may be unencoded bit-map data.

Also, as an example of content, a digital photograph is used. Alternatively, as long as an image can be stored as digital data, the image may be data of a scanned painting, for example.

(2) In Embodiment 1, the CPU101, the ROM102, the RAM103, the hard disk device interface 104, the external recording medium reading/writing device interface 105, the USB control device interface 106, the output device interface 107, the input device interface 108, the communication device interface 109, the decoder 111, and the bus line 120 are integrated into the system LSI 110. Integration into one LSI is not required, however, and a plurality of integrated circuits may be used.

(3) In Embodiment 1, the decoder 111 is implemented by a DSP. Alternatively, as long as a function of decoding encoded data is provided, the decoder 111 does not necessarily need to be implemented by a DSP. For example, the CPU 101 may function also as the decoder 111. Alternatively, another CPU or a dedicated circuit composed of an ASIC or the like may be used.

(4) In Embodiment 1, the input device 170 has a function of receiving an operation command transmitted wirelessly from a user via the remote control 197. Alternatively, as long as a function of receiving an operation command from a user is provided, the input device 170 is not required to have the function of receiving an operation command transmitted wirelessly via the remote control 197. For example, the input device 170 may include a keyboard and a mouse and have a function of receiving an operation command from a user via the keyboard and the mouse, or may include buttons and have a function of receiving an operation command from a user via the buttons.

(5) In Embodiment 1, the image group data reception unit 201 receives a designation of two or more images and reads the designated images as images included in the same image group. Alternatively, as long as a correspondence can be established between images and an image group, the following structure may be employed. For example, the image group data reception unit 201 may receive images and a list of the images included in an image group and establish a correspondence between the images and the image group based on the received list. The image group data reception unit 201 may also, for example, receive images, information on the image capture time of the images, and information indicating correspondence between the information on the image capture time and an image group and establish correspondence between the images and the image group based on the received image capture time.

Also, as long as correspondence can be established between images and an image group, the correspondence is not required to be established by a user's designation of images. Alternatively, a conventional technique may be used to associate images with image groups automatically.

(6) In Embodiment 1, the image group data reception unit 201 sequentially assigns image IDs to read images. Alternatively, as long as image IDs are assigned to images in one-to-one correspondence, the image IDs do not necessarily need to be sequentially assigned.

(7) In Embodiment 1, colors specified by the color feature value extraction unit 223 are black, blue, green, and white. Alternatively, colors to be specified may be, for example, red, yellow, or other colors.

(8) In Embodiment 1, the image feature calculation unit 205 calculates the color feature values after calculating the facial feature values, subsequently calculating the object feature values. However, as long as the facial feature values, the color feature values, and the object feature values are calculated, it is not necessary to calculate the feature values in this order. For example, calculation of feature values may start in the order of color feature values, facial feature values, and object feature values. Alternatively, calculation of each set of feature values may start simultaneously.

(9) In Embodiment 1, the color feature value extraction unit 223 calculates the color feature values based on every pixel included in an image. As long as color feature values can be calculated, however, it is not necessary to calculate the color feature values based on every pixel included in an image. For example, after identifying the color of each pixel, the color feature values may be calculated based only on pixels that are identified as having the same color, are adjacent, and of which at least a minimum threshold number are present.

Figure 26:
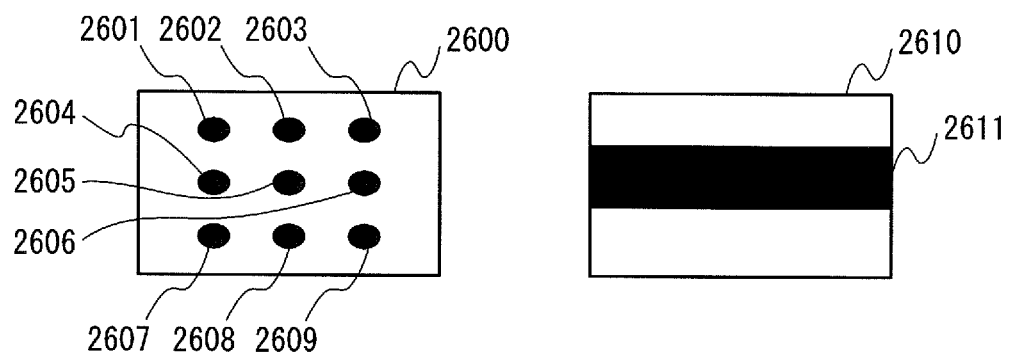
FIG. 26 shows images belonging to an image group.

FIG. 26 shows images belonging to an image group.

An image 2600 includes a pixel group 2601 through a pixel group 2609, each composed of pixels identified as black and fewer in number than the minimum threshold. Other than these pixel groups, no pixels are identified as black.

An image 2610 includes a pixel group 2611 composed of at least the minimum threshold number of pixels identified as black.

In this image group, color feature values are not extracted for black for image 2600, whereas color feature values are extracted for black for image 2610.

In general, a region in which pixels that have the same identified color congregate to some degree is, for example, a background region in the image, such as the sky or the ground. In such background regions of an image, the characteristics of an event into which the image is classified are often included.

With this structure, the color feature value extraction unit 223 can calculate the color feature values based on the color included in the background of the image.

(10) In Embodiment 1, the face models are, for example, information on the brightness of a part of a human face such as eyes, nose, or mouth, relative positional relations between these parts, and the like. As long as a face can be recognized, however, other information may be used.

(11) In Embodiment 1, the image group classification unit 208 performs classification of image groups by classifying an image group into a plurality of corresponding events when such a plurality of corresponding events exists. Alternatively, image groups may be classified into only one event by, for example, ranking events by priority, searching for a corresponding event in order of priority, and taking the first event that is found to be the event into which the image group is to be classified.

(12) In Embodiment 1, the calculation of shared features by the event feature calculation unit 207 is, for example, to consider a color as a shared feature when the same color has a ratio of 0.4 or greater in the color feature value averages 502 for each image group. Alternatively, as long as shared features can be calculated, another method may be used to calculate shared features, such as a logistic regression analysis method or an SVM (Support Vector Machine) method.

For example, if using the logistic regression analysis method, the event feature calculation unit 207 receives a set of image groups, corresponding color feature value averages, and the event names to which images are to be classified (hereinafter referred to as the "correct event"). The event feature calculation unit 207 then trains on the correct events using the received color feature value averages, calculating a standard corresponding to each correct event.

Using the logistic regression analysis method allows for the inclusion of the concept of probability into standards. For example, if the value of green among the color feature value averages is 0.4 or greater, classification into a green event is made with 80% probability.

(13) In Embodiment 2, the facial features extracted by the image group feature calculation unit 1206 are, for example, a relative positional relation between parts of a human face such as eyes, nose, or mouth, an area ratio of each of these parts, and the like. As long as facial features that distinguish a face are indicated, however, other facial features may be used, such as eye color, a position of a mole, skin color, or the like. Alternatively, the face models may be any combination of information representing a plurality of facial features.

(14) In Embodiment 2, the standard for determining that a recognized face sorted as being the same person is a family member is that the recognized face be found in a plurality of image groups. The standard for determining that a recognized face sorted as being the same person is a friend is that the recognized face be found only in one image group and occur at least twice. The standard for determining that a recognized face sorted as being the same person is a stranger is that the recognized face be determined not to be a family member or friend. It is not necessary, however, to adopt these standards for determination. For example, the standard for determining that a recognized face sorted as being the same person is a family member may be that the recognized face be found in at least three image groups. The standard for determining that a recognized face sorted as being the same person is a friend may be that the recognized face be found in two image groups. The standard for determining that a recognized face sorted as being the same person is a stranger may be that the recognized face be determined not to be a family member or friend.

While family member, friend, and stranger have been used as the names for classification, it is not a requirement for these names to be used. Furthermore, classification as a family member may be achieved by registering images of faces of people to be classified as family members in advance, subsequently classifying people as family members if their faces have the same characteristics as the registered images of people to be classified as family member. Alternatively, people appearing in images may be classified as family members through visual confirmation by the user.

(15) In Embodiment 1, the event feature information is as shown in FIG. 6. Alternatively, event feature information that includes standards other than the standards in FIG. 6 or event names other than the event names in FIG. 6 may be used.

Furthermore, in Embodiment 2, the event feature information is as shown in FIG. 15. Alternatively, event feature information that includes standards other than the standards in FIG. 15 or event names other than the event names in FIG. 15 may be used.

FIG. 25 shows an example of event feature information other than the event feature information in FIG. 6 and the event feature information in FIG. 15.

The event feature information shown in FIG. 25 indicates the following. a) The standard for classification as a campfire event is satisfaction of the conditions "black 0.4 or greater 2501" and "five or more other people 2511". b) The standard for classification as a fireworks event is satisfaction of the conditions "black 0.4 or greater 2501" and "fewer than five other people 2512". c) The standard for classification as a pool event is satisfaction of the conditions "blue 0.4 or greater and less than 0.8 (2502)" and "five or more other people 2511". d) The standard for classification as a fishing event is satisfaction of the conditions "blue 0.4 or greater and less than 0.8 (2502)" and "fewer than five other people 2512". e) The standard for classification as a picnic event is satisfaction of the conditions "green 0.4 or greater 2503" and "five or more other people 2511". f) The standard for classification as an insect collecting event is satisfaction of the conditions "green 0.4 or greater 2503" and "fewer than five other people 2512". g) The standard for classification as an ice skating event is satisfaction of the conditions "white 0.4 or greater 2504" and "five or more other people 2511". h) The standard for classification as a skiing event is satisfaction of the conditions "white 0.4 or greater 2504" and "fewer than five other people 2512". i) The standard for classification as a beach bathing event is satisfaction of the conditions "blue 0.8 or greater 2505" and "five or more other people 2511". j) The standard for classification as a scuba diving event is satisfaction of the conditions "blue 0.8 or greater 2505" and "fewer than five other people 2512". k) The standard for classification as a sports day event is satisfaction of the conditions "blue 0.4 or greater in the upper half of the image 2506" and "five or more other people 2511". l) The standard for classification as a roller skating event is satisfaction of the conditions "blue 0.4 or greater in the upper half of the image 2506" and "fewer than five other people 2512". m) The standard for classification as a kendo event is satisfaction of the conditions "blue less than 0.4 in the upper half of the image 2507" and "five or more other people 2511". n) The standard for classification as an everyday life at home event is satisfaction of the conditions "blue less than 0.4 in the upper half of the image 2507" and "fewer than five other people 2512".

(16) In Embodiment 3, clustering operations on target image groups using color feature values have been described as an example of the method by which the clustering unit 2207 classifies into events. As long as target image groups can be classified, however, any classification method may be used. For example, clustering operations may be performed using feature values other than color feature values. For example, the K-means method may be used to classify target image groups.

(17) In Embodiment 3, the clustering value is 0.25. A value other than 0.25 may be used, however, such as 0.1, as long as the value serves as a standard for determining whether color values in the color feature value averages are similar to each other.

The clustering value has been described as being stored in advance in the clustering unit 2207, but other configurations are possible. For example, a configuration may be adopted in which the user sets the clustering value.

(18) In Embodiment 3, the clustering unit 2207 classifies each image group into only one cluster. Alternatively, the clustering unit 2207 may classify an image group into two different clusters.

(19) A control program, which is composed of program code for causing the image group classification operations and the like described in Embodiments 1 through 3 (see FIGS. 7, 10, 16, 18, and 23) to be executed by the CPU of the image classification device and the circuits connected with the CPU, can be recorded on a recording medium or distributed via various types of communication channels and the like. This type of recording medium may include an IC card, a hard disk, an optical disc, a flexible disk, a ROM, and the like. The distributed control program may be provided for use by storage in a memory or the like read by the CPU, and the various functions described in the embodiments may be realized by the CPU executing the control program. Part of the control program may be transmitted to another device (CPU) that can execute programs and that is different from the image classification device via various types of communication channels, and this part of the control program may be executed by the other device.

(20) In Embodiment 1, the facial feature value extraction unit 222 sequentially assigns face IDs to respective recognized faces. Alternatively, as long as the face IDs are assigned with no overlap, the face IDs do not necessarily need to be sequentially assigned.

(21) In Embodiment 1, the color feature values indicate the features of all parts of an image. Alternatively, as long as the color feature values indicate a color feature of the image, the color feature values may indicate a feature of a part of the image, such as an upper half of the image, or a plurality of parts of the image, such as the left 10% of the image and the right 10% of the image.

(22) In Embodiment 2, an example of the event feature information is the combinations of a standard and an event name as shown in FIG. 15. The event feature information is not, however, limited to the event feature information shown in FIG. 15. For example, a variety of parameters for family members, friends, and strangers may be used in the standards.

(23) In Embodiment 3, the clustering unit classifies image groups based on a clustering value that is determined by color feature value averages. As long as image groups can be classified, however, it is not necessary for classification to be based on a clustering value that is determined by color feature value averages.

As an example, the clustering unit may classify image groups based on a clustering value that is determined so that the number of image groups classified into each classification category is uniform.

(24) The following describes the structure of an image classification device relating to an embodiment of the present invention, modifications of the embodiment, and effects of the embodiment and the modifications.

(a) An image classification device according to an embodiment of the present invention comprises an image group feature calculation unit configured to calculate image group feature information, indicating features of an image group, based on image feature information, indicating features of an image, for all images in an image group or for a portion of the images in the image group, the portion including at least two of the images; and an image group classification unit configured to classify an image group into at least one of a plurality of different classifications based on the image group feature information for the image group and on a classification standard.

With the above structure, the image classification device classifies images by image group based on image group feature information calculated based on image features not limited to image capture time.

Accordingly, the image classification device achieves the advantageous effect of classifying, based on image features other than image capture time, images without separating images belonging to the same image group into different categories.

Figure 27:
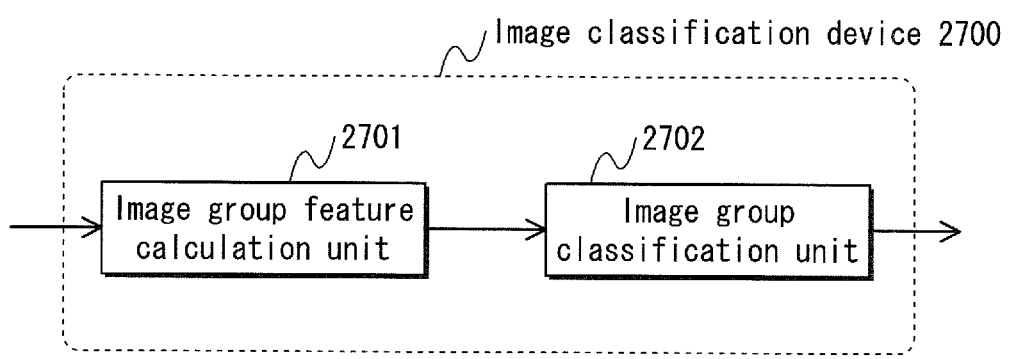
FIG. 27 is a functional block diagram showing the functional structure of an image classification device 2700.

FIG. 27 is a functional block diagram showing the functional structure of an image classification device 2700 in the above modification.

As shown in FIG. 27, the image classification device 2700 includes an image group feature calculation unit 2701 and an image group classification unit 2702.

The image group feature calculation unit 2701 is connected to the image group classification unit 2702 and has a function to calculate image group feature information, indicating features of an image group, based on image feature information, indicating features of an image, for all images in an image group or for a portion of the images in the image group, the portion including at least two of the images.

As an example, the image group feature calculation unit 2701 may be implemented by the image group feature information reading/writing unit 204, the image group feature calculation unit 206, the image group information reception unit 211, and the image group feature information storage unit 233 in Embodiment 1 (see FIG. 2).

The image group classification unit 2702 is connected to the image group feature calculation unit 2701 and has a function to classify an image group into at least one of a plurality of different classifications based on the image group feature information for the image group and on a classification standard.

As an example, the image group classification unit 2702 may be implemented by the image group classification unit 208, the event feature information reading/writing unit 209, the classification result output unit 210, the event information reception unit 212, and the event feature information storage unit 234 in Embodiment 1 (see FIG. 2).

(b) The image classification device may further comprise a standard generation unit configured to generate the classification standard based on a plurality of pieces of image group feature information.

This structure allows the image classification device to create classification standards, thus achieving the advantageous effect of allowing for classification of image groups without external provision of standards.

(c) The image classification device may further comprise an image feature calculation unit configured to calculate, from one image, a piece of image feature information indicating features of the image, wherein the image group feature calculation unit calculates the image group feature information based on pieces of image feature information calculated by the image feature calculation unit.

This structure allows the image classification device to create image feature information for the images in an image group, thus achieving the advantageous effect of allowing for classification of image groups without external provision of image feature information.

(d) The image feature calculation unit may include a facial feature calculation unit that attempts to detect a face included in an image through comparison with a predetermined face model indicating facial characteristics and calculates facial features for any face included in the image. The image feature information calculated by the image feature information calculation unit may include the facial features calculated by the facial feature calculation unit. The image group feature calculation unit may include facial information in the image group feature information. The classification standard may include a facial standard for classifying the facial information into one of a plurality of different classifications. The image group classification unit may classify the image group based on the facial information included in the image group feature information for the image group and on the facial standard included in the classification standard.

This structure achieves the advantageous effect of allowing for classification of image groups focusing on people appearing in images of an image group.

(e) The facial feature calculation unit may include, in the facial features, information on an area occupied by a face detected in an image. The image group feature calculation unit may include, in the image group feature information, area information on an area occupied by a face detected by the facial feature calculation unit in each image included in the image group corresponding to the image group feature information. The facial standard may include a facial area standard for classifying the information on the area occupied by a face into one of a plurality of different classifications. The image group classification unit may classify the image group based on the area information included in the image group feature information of the image group and on the facial area standard included in the facial standard included in the classification standard.

When photographing people, photographers tend to zoom in on the face of people in whom they are interested, with other people's faces appearing small in the photograph.

Therefore, the area of a region occupied by a face can be considered to reflect the degree of interest the photographer had in that person.

Accordingly, the above structure achieves the advantageous effect of allowing for classification of image groups focusing on the degree of interest towards the people appearing in images of an image group.

(f) The information, included in the facial features, on the area occupied by a face may indicate the area of the face with a largest area among each detected face included in an image in which at least one face is detected. The area information included in the image group feature information may indicate a sum of areas, the sum of areas being a sum of a largest area occupied by any detected face in each image in the image group corresponding to the image group feature information, divided by a count of images in which a face is detected.

Among people appearing in an image, the face with the largest area can be considered the main person, on whom the photographer focused the most.

Therefore, dividing the sum of the largest area occupied by a face in each image in which a face is detected by a count of images in which a face is detected can be considered to yield a value representing an average, for all images in which a face is detected, of the degree of interest towards the person in whom the photographer was most interested in.

Accordingly, the above structure achieves the advantageous effect of allowing for classification of image groups focusing on the average degree of interest towards the main people appearing in images of an image group.

(g) The image classification device may further comprise an image storage unit for storing images belonging to a plurality of image groups. The facial feature calculation unit may attempt to detect a face in each of the images stored by the image storage unit. The image classification device may further comprise: a face clustering unit configured to classify each detected face detected by the facial feature calculation unit in each image stored by the image storage unit into one of a plurality of different face groups based on features of the detected face; and a person group sorting unit configured to sort a face group into a first person group when faces classified by the face clustering unit as belonging to the face group occur in two or more image groups, to sort a face group into a second person group when faces classified by the face clustering unit as belonging to the face group occur in only one image group and occur a plurality of times, and to sort a face group into a third person group when the face group is not sorted into the first person group nor into the second person group. The image group feature calculation unit may include, in the image group feature information, area information on at least one of an area occupied by a face belonging to the first person group, an area occupied by a face belonging to the second person group, and an area occupied by a face belonging to the third person group, among each area occupied by a face detected by the facial feature calculation unit in each image included in the image group corresponding to the image group feature information. The facial standard may include a facial area standard for classifying, into one of a plurality of different classifications, at least one of the area occupied by a face belonging to the first person group, the area occupied by a face belonging to the second person group, and the area occupied by a face belonging to the third person group, among each area occupied by a face.

This structure sorts each person appearing in an image into the first person group when the person appears in two or more image groups, into the second person group when the person appears in only one image group and appears a plurality of times, and into the third person group when the person is not sorted into the first person group nor into the second person group. This achieves the advantageous effect of allowing for classification of image groups focusing on the degree of interest towards the people appearing in these groups.

(h) The facial feature calculation unit may include, in the facial features, information on a count of faces detected in an image. The image group feature calculation unit may include, in the image group feature information, count information on a count of faces detected by the facial feature calculation unit in images included in the image group corresponding to the image group feature information. The facial standard may include a face count standard for classifying the information on a count of faces into one of a plurality of different classifications. The image group classification unit may classify the image group based on the count information included in the image group feature information for the image group and on the facial standard included in the classification standard.

This structure achieves the advantageous effect of allowing for classification of image groups focusing on the count of people appearing in images of an image group.

(i) The information, in the facial features, on a count of faces detected in an image may indicate a count of all faces included in the image. The count information included in the image group feature information may include at least one of (i) a ratio of a count of images including a detected face in the image group corresponding to the image group feature information to a count of images in the image group corresponding to the image group feature information, (ii) a total count of detected faces in the images including a detected face in the image group corresponding to the image group feature information divided by the count of images including a detected face in the image group corresponding to the image group feature information, and (iii) a count of detected faces in an image having a largest count of detected faces among the images in the image group corresponding to the image group feature information.

The ratio of the count of images including a detected face to the count of images in the image group yields the proportion of images, in an image group, in which a detected face appears.

The total count of detected faces in the images including a detected face divided by the count of images including a detected face yields an average count of faces appearing in images in which a face is detected.

Accordingly, the above structure achieves the advantageous effect of allowing for classification of image groups focusing on at least one of the following values: the ratio of images including a detected face to images in the image group, the average count of faces appearing in images in which a face is detected, and the count of detected faces in the image having the largest count of faces.

(j) The image classification device may further comprise an image storage unit for storing images belonging to a plurality of image groups. The facial feature calculation unit may attempt to detect a face in each of the images stored by the image storage unit. The image classification device may further comprise: a face clustering unit configured to classify each detected face detected by the facial feature calculation unit in each image stored by the image storage unit into one of a plurality of different face groups based on features of the detected face; and a person group sorting unit configured to sort a face group into a first person group when faces classified by the face clustering unit as belonging to the face group occur in two or more image groups, to sort a face group into a second person group when faces classified by the face clustering unit as belonging to the face group occur in only one image group and occur a plurality of times, and to sort a face group into a third person group when the face group is not sorted into the first person group nor into the second person group. The image group feature calculation unit may include, in the image group feature information, count information on at least one a count of faces belonging to the first person group, a count of faces belonging to the second person group, and a count of faces belonging to the third person group among the count of faces detected by the facial feature calculation unit in the images included in the image group corresponding to the image group feature information. The facial standard may include a face count standard for classifying, into one of a plurality of different classifications, at least one of the count of faces belonging to the first person group, the count of faces belonging to the second person group, and the count of faces belonging to the third person group, among each count of faces.

This structure sorts each person appearing in a photograph into the first person group when the person appears in two or more image groups, into the second person group when the person appears in only one image group and appears a plurality of times, and into the third person group when the person is not sorted into the first person group nor into the second person group. This achieves the advantageous effect of allowing for classification of image groups focusing on the count of people appearing in these groups.

(k) The image feature calculation unit may include a color feature calculation unit that calculates color features on colors included an image. The image feature information calculated by the image feature information calculation unit may include the color features calculated by the color feature calculation unit. The image group feature calculation unit may include color information in the image group feature information. The classification standard may include a color standard for classifying the color information into one of a plurality of different classifications. The image group classification unit may classify the image group based on the color information included in the image group feature information for the image group and on the color standard included in the classification standard.

This structure achieves the advantageous effect of allowing for classification of image groups based on color characteristics of images in an image group.

(l) The image feature calculation unit may calculate the color features while limiting values reflected in the color features to values of pixels forming a pixel group of at least a predetermined number of adjacent pixels of a same color.

This structure achieves the advantageous effect of extracting color feature values while distinguishing between colors of background areas, such as of the sky or ground, that are represented by a congregation to some degree of pixels of the same color, and colors other than background areas, such as people's clothing, that are not represented by a congregation to some degree of pixels of the same color.

(m) An image classification device according to an embodiment of the present invention comprises: an image group feature calculation unit configured to calculate image group feature information, indicating features of an image group, based on image feature information, indicating features of an image, for all images in an image group or for a portion of the images in the image group, the portion including at least two of the images; and an image group classification unit configured to classify a plurality of image groups based on the image group feature information for the plurality of image groups, so that image groups with similar characteristics are classified into a same classification.

With the above structure, the image classification device according to the present embodiment classifies images by image group based on image group feature information calculated based on image features not limited to image capture time.

Accordingly, the image classification device achieves the advantageous effect of classifying, based on image features other than image capture time, images without separating images belonging to the same image group into different categories.

Industrial Applicability

The image classification device of the present invention is widely applicable to devices having a function to store a plurality of digital images.

Reference Signs List 100 image classification device
201 image group data reception unit
202 image reading/writing unit
203 image feature information reading/writing unit
204 image group feature information reading/writing unit
205 image feature calculation unit
206 image group feature calculation unit
207 event feature calculation unit
208 image group classification unit
209 event feature information reading/writing unit
210 classification result output unit
211 image group information reception unit
212 event information reception unit
231 image storage unit
232 image feature information storage unit
233 image group feature information storage unit
234 event feature information storage unit
221 image feature calculation control unit
222 facial feature value extraction unit
223 color feature value extraction unit
224 object feature value extraction unit

The invention claimed is:

1. An image classification device comprising:
a face clustering unit configured to, for each of a plurality of images, extract features of each face included in the image and to classify each face into a face group containing one or more faces determined to be of a same person;
an image group feature calculation unit configured to calculate image group feature information, indicating features of an image group composed of a plurality of images, based on the face group into which the face clustering unit classifies at least one face among any faces included in images of the image group;
an image group classification unit configured to classify an image group into at least one of a plurality of different classifications based on the image group feature information for the image group; and
a person group sorting unit configured to sort each face group into one of one or more person groups indicating a predetermined human relationship, wherein
the image group feature information includes person group information indicating the one person group into which each face group is sorted, and
the image group classification unit classifies the image group based on the person group information included in the image group feature information.

2. The image classification device of claim 1, wherein the person group sorting unit sorts each face group based on a count of image groups that include any face classified into the face group by the face clustering unit.

3. The image classification device of claim 2, wherein the person group sorting unit sorts a face group into a first person group when faces classified by the face clustering unit as belonging to the face group occur in two or more image groups, sorts a face group into a second person group when faces classified by the face clustering unit as belonging to the face group occur in only one image group and occur a plurality of times, and sorts a face group into a third person group when the face group is not sorted into the first person group or into the second person group.

4. The image classification device of claim 3, wherein the first person group indicates a family member, the second person group indicates a friend, and the third person group indicates a stranger.

5. The image classification device of claim 1, wherein the image group feature calculation unit calculates the image group feature information for the image group based on the face group by including, in the person group information, face area information on an area of each face, among faces in the face group, that is included in the image group.

6. The image classification device of claim 1, wherein the image group feature calculation unit calculates the image group feature information for the image group based on the face group by including, in the person group information, face count information on a count of faces included in the image group.

7. The image classification device of claim 1, wherein the image group classification unit classifies the image group based on the face group and based on a standard defined for each of the plurality of different classifications.

8. The image classification device of claim 7, further comprising: a standard generation unit configured to generate the standard based on a plurality of pieces of the image group feature information.

9. An image classification method of using an image classification device, the image classification method comprising:
- extracting, for each of a plurality of images, features of each face included in the image and classifying each face into a face group containing one or more faces determined to be of a same person, said extracting being performed using a face clustering unit of the image classification device;
- calculating image group feature information, indicating features of an image group composed of a plurality of images, based on the face group into which at least one face among any faces included in images of the image group is classified in said extracting, said calculating being performed using an image group feature calculation unit of the image classification device;
- classifying an image group into at least one of a plurality of different classifications based on the image group feature information for the image group, said classifying being performed using an image group classification unit of the image group classification device; and
- sorting each face group into one of one or more person groups indicating a predetermined human relationship, said sorting being performed using a person group sorting unit of the image classification device, wherein
- the image group feature information includes person group information indicating the one person group into which each face group is sorted, and
- said classifying of the image group classifies the image group based on the person group information included in the image group feature information.

10. A non-transitory computer-readable recording medium having an image classification program recorded thereon, the image classification program causing a computer to function as an image classification device for classifying images by executing a method, comprising:
- extracting, for each of a plurality of images, features of each face included in the image and classifying each face into a face group containing one or more faces determined to be of a same person;
- calculating image group feature information, indicating features of an image group composed of a plurality of images, based on the face group into which at least one face among any faces included in images of the image group is classified in said extracting;
- classifying an image group into at least one of a plurality of different classifications based on the image group feature information for the image group; and
- sorting each face group into one of one or more person groups indicating a predetermined human relationship, wherein
- the image group feature information includes person group information indicating the one person group into which each face group is sorted, and
- said classifying of the image group classifies the image group based on the person group information included in the image group feature information.

11. An integrated circuit comprising:
- a face clustering unit configured to, for each of a plurality of images, extract features of each face included in the image and to classify each face into a face group containing one or more faces determined to be of a same person;
- an image group feature calculation unit configured to calculate image group feature information, indicating features of an image group composed of a plurality of images, based on the face group into which the face clustering unit classifies at least one face among any faces included in images of the image group;
- an image group classification unit configured to classify an image group into at least one of a plurality of different classifications based on the image group feature information for the image group; and
- a person group sorting unit configured to sort each face group into one of one or more person groups indicating a predetermined human relationship, wherein
- the image group feature information includes person group information indicating the one person group into which each face group is sorted, and
- the image group classification unit classifies the image group based on the person group information included in the image group feature information.

* * * * *